US012640054B2

(12) United States Patent
German et al.

(10) Patent No.: US 12,640,054 B2
(45) Date of Patent: May 26, 2026

(54) COMPUTATIONAL IN SILICO MODEL FOR PLACENTAL BARRIER

(71) Applicant: CFD Research Corporation, Huntsville, AL (US)

(72) Inventors: Carrie Lynn German, Huntsville, AL (US); Balabhaskar Prabhakarpandian, Madison, AL (US); Ketan Harendrakumar Bhatt, Huntsville, AL (US); Ashley Gilbert Helser, Huntsville, AL (US)

(73) Assignee: CFD RESEARCH CORPORATION, Huntsville, AL (US)

( * ) Notice: Subject to any disclaimer, the term of this patent is extended or adjusted under 35 U.S.C. 154(b) by 237 days.

(21) Appl. No.: 18/511,367

(22) Filed: Nov. 16, 2023

(65) Prior Publication Data

US 2024/0169859 A1      May 23, 2024

Related U.S. Application Data

(60) Provisional application No. 63/384,011, filed on Nov. 16, 2022.

(51) Int. Cl.
G09B 23/28          (2006.01)
G09B 23/30          (2006.01)

(52) U.S. Cl.
CPC ......... G09B 23/281 (2013.01); G09B 23/303 (2013.01)

(58) Field of Classification Search
CPC ............................. G09B 23/281; G09B 23/33
See application file for complete search history.

(56) References Cited

PUBLICATIONS

Mitchell, A. A. et al. Medication Use During Pregnancy, With Particular Focus On Prescription Drugs: 1976-2008. Am. J. Obstet. Gynecol. 205, 51.e1-51.e8 (2011).
Ushijima, K. et al. Placental transport of bile acids: analysis of bile acids in maternal serum and urine, umbilical cord blood, and amniotic fluid. Kurume Med. J. 48, 87-91 (2001).
Feghali, M., Venkataramanan, R. & Caritis, S. Pharmacokinetics of drugs in pregnancy. Semin. Perinatol. 39, 512-519 (2015).
Aghababaei, M., Hogg, K., Perdu, S., Robinson, W. & Beristain, A. ADAM12-directed ectodomain shedding of E-cadherin potentiates trophoblast fusion. Cell Death Differ. 22, 1970-1984 (2015).

(Continued)

*Primary Examiner* — Kesha Frisby

(74) *Attorney, Agent, or Firm* — MASCHOFF BRENNAN

(57)          ABSTRACT

The method involves computationally modeling a placenta by simulating physical placenta models with computational in silico models. The simulated data is compared with actual data from the physical models, and the simulation is iterated until a match is achieved. The method may also include calibrating diffusion parameters for testing substances, and configuring the models for analyzing instances of fluid-induced shear and substance transport. The simulated data may be used to obtain maternal-fetal pharmacokinetic in silico placenta models, and the method may be used to obtain predictions for time-dependent concentrations of molecules in fetal circulation. The computational models may consider instances of fluid-diffusive transport and carrier-mediated transport in calculations and determinations of transport characteristics and values of different testing substances.

30 Claims, 24 Drawing Sheets

(56)　　　　　References Cited

PUBLICATIONS

Leach, L. & Firth, J. A. Advances in understanding permeability in fetal capillaries of the human placenta: a review of organization of the endothelial paracellular clefts and their junctional complexes. Reprod. Fertil. Dev. 7, 1451-1456 (1995).

Kwok, A. K. H., Yeung, C.-K., Lai, T. Y. Y., Chan, K.-P. & Pang, C. P. Effects of trypan blue on cell viability and gene expression in human retinal pigment epithelial cells. Br. J. Ophthalmol. 88, 1590-1594 (2004).

Awad, D., Schrader, I., Bartok, M., Mohr, A. & Gabel, D. Comparative Toxicology of Trypan Blue, Brilliant Blue G, and Their Combination Together with Polyethylene Glycol on Human Pigment Epithelial Cells. Invest. Ophthalmol. Vis. Sci. 52, 4085-4090 (2011).

Herland, A. et al. Quantitative prediction of human pharmacokinetic responses to drugs via fluidically coupled vascularized organ chips. Nat. Biomed. Eng. 1-16 (2020) doi: 10.1038/s41551-019-0498-9.

Kannan, R. et al. A quasi-3D wire approach to model pulmonary airflow in human airways. Int. J. Numer. Methods Biomed. Eng. 33, e2838 (2017).

Przekwas A., Friend T., Teixeira R., Chen ZJ., Wilkerson P.,. Spatial Modeling Tools for Cell Biology. www.dtic.mil/cgi-bin/GetTRDoc? AD=ADA460852 (2006).

Przekwas, A., German, C., Garimella, T. & Singh, N. Multiscale Simulation Framework for Personalized Pharmacology, Integrating Machine Learning with Multiscale Modeling for Biomedical, Biological, and Behavioral Systems. (2019).

Chen, Z. & Przekwas, A. A coupled pressure-based computational method for incompressible/compressible flows. J. Comput. Phys. 229, 9150-9165 (2010).

German, C., Boyer, A., Przekwas, A., Bader, S. E. & Cabal, A. A physiologically based model to capture species-dependent differences in oxygen distribution in the posterior eye. Model. Artif. Intell. Ophthalmol. 3, 10-42 (2021).

Kannan, R. & Przekwas, A. A multiscale absorption and transit model for oral drug delivery: Formulation and applications during fasting conditions. Int. J. Numer. Methods Biomed. Eng. 36, e3317 (2020).

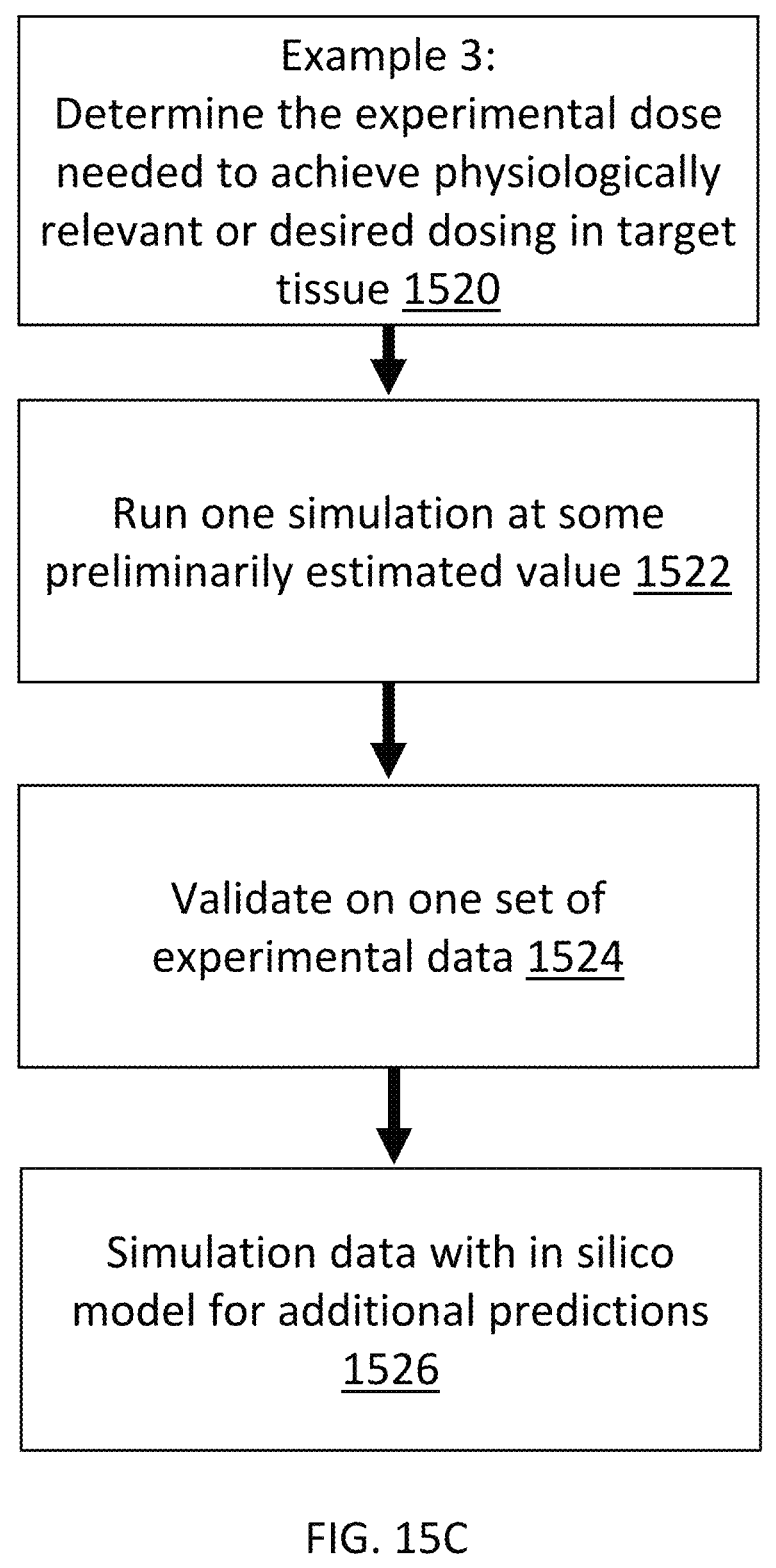

Example 3:
Determine the experimental dose needed to achieve physiologically relevant or desired dosing in target tissue 1520

Run one simulation at some preliminarily estimated value 1522

Validate on one set of experimental data 1524

Simulation data with in silico model for additional predictions 1526

FIG. 15C

COMPUTATIONAL IN SILICO MODEL FOR PLACENTAL BARRIER

CROSS-REFERENCE TO RELATED APPLICATIONS

This patent application claims priority to U.S. Provisional Application No. 63/384,011 filed Nov. 16, 2022, which provisional is incorporated herein by specific reference in its entirety.

U.S. GOVERNMENT RIGHTS

This invention was made with government support under 1R43HD102269-01A1 awarded by the National Institutes of Health. The government has certain rights in the invention.

BACKGROUND

Field

This invention relates to the fields of physiology and microfluidics as related to the placenta. More specifically, the present invention pertains to microfluidic systems that mimic the structure, dimensions, fluid flow and physiological function of the placental barrier as well as complimentary computational models of the microfluidic system.

Description of Related Art

On average, pregnant women use 2.6 medications during pregnancy[1]. Many pregnant women have medical conditions (e.g., asthma, diabetes, etc.) that require continued use of pre-pregnancy medications. Others develop or exacerbate conditions during pregnancy that require initiation of therapeutic treatments, such as gestational diabetes or preeclampsia superimposed on arterial hypertension. Drugs taken during pregnancy can alter placental function (e.g., decrease oxygen transport), cause uteral muscle contractions that lead to preterm labor, or be transported across the placenta to directly impact the health of the fetus. As such, it can be important to monitor how drugs or other substances can influence development and long-term health of the fetus. Thus, understanding how and to what extent test agents (e.g., compounds, proteins, nucleic acids, particles, bacteria, viruses, polymers, etc.) are transferred into or across the placental barrier is critical to safely and effectively treating the mother and/or fetus.

Substances that are in maternal circulation reach the fetus by flowing into the intervillous space, crossing the placental membrane (e.g., placental barrier) and entering the fetal circulation through chorionic villi capillaries that feed into the umbilical cord. The mechanisms of transport are not fully understood, as in some cases transplacental substrate transport is facilitated by active transporters[2,3]. The anatomy and physiology of the placenta change significantly over the gestation period. At term, the placenta, comprising a mixture of cytotrophoblasts, syncytiotrophoblasts and part of the fetal vasculature system, varies in thickness from 2-4 cm. The diameter of the spiral arteries invading the maternal uterine vasculature averages 200 μm, but can widen from 500 to 1000 μm. The distance across the intervillous space ranges from 16 to 32 μm. The capillary diameter of the fetal vasculature system ranges from 30 to 80 μm, with terminal villi mean vessel diameters of approximately 14.5 μm.

The placenta is one of the least understood organs of the human body. Acting as a barrier between mother and fetus, the placenta barrier mediates transport of oxygen, nutrients, fetal waste products and other compounds present in maternal circulation. Full term placental explants are currently the most widely used models for assessing transport and barrier function. Unfortunately, these models are dependent upon the availability of fresh placentas. There is a critical need for standardized tools that quantitatively assess placental barrier transport to enable prediction of maternal and fetal pharmacokinetics (PK) and placental and fetal toxicity.

The human placenta is a complex temporary organ which has a vital role in fetal protection. Despite the placenta's important barrier function for protection, there is little understanding of the properties of this biological barrier. Since in vivo evaluation of maternal to fetal transport is ethically impossible, ex vivo placental reperfusion assays and in vitro cell-based assays have been developed to evaluate barrier function and drug transport to the fetus. Additionally, in silico models have been developed in an effort to predict maternal and fetal compound exposure and toxicity. Ex vivo evaluations are typically performed on placentas obtained from full term deliveries, and thus represent third trimester transplacental transport. Unfortunately, ex vivo placentas are not always readily available or sustainable for long time periods. Similarly, literature reported in vitro models lack certain anatomical and physiological relevance and are not commonly available from commercial sources. In silico approaches by themselves have limited ability for in vivo prediction capabilities, physiological relevance and gestational age dependence. In summary, a standardized and validated model for evaluating and quantifying compound transport and predicting exposure and toxicity does not exist.

SUMMARY

In some embodiments, a microfluidic in vitro placenta device for studying a placenta can include: a maternal circulation chamber; an intervillous space chamber adjacent to and porously coupled with the maternal circulation chamber; a placental barrier chamber adjacent to and porously coupled with the intervillous space; a fetal circulation chamber adjacent to and porously coupled with the placental barrier chamber; wherein a first porous wall is positioned between the maternal circulation chamber and the intervillous space, a second porous wall is positioned between the intervillous space and the placental barrier chamber, and a third porous wall is positioned between the placental barrier chamber and the fetal circulation chamber, which is configured as a microfluidic in vitro model of a placenta.

In some embodiments, a method of computationally modeling a placenta can include: generating a 3D geometry computer model of an in vitro placenta device; generating a mesh for the 3D geometry computer model; generating governing equations for the computer model of physics and other phenomena occurring within or upon the in vitro placenta device; generating volume and boundary conditions that characterize the materials and conditions inside or at the boundary of the in vitro placenta device; and processing the computer model using a multiscale-multiphysics solver module to obtain an in silico model of the in vitro placenta device.

In some embodiments, a method of computationally modeling a placenta can be performed. The in silico placenta model can be used for conducting simulations to generate data to represent an in vivo placenta. The in silico placenta model can use as parameter inputs or parameter initialization, data from the in vitro placenta device of one of the embodiments, wherein the in vitro placenta device is a physical model of a placenta. Then, the computing system can be used to generate simulations of the in vitro model device. Then, parameters established from comparing simulations of the in vitro placenta device with experimental data from the in vitro placenta device can be used as parameter inputs or parameter initializations for a physiology-based pharmacokinetic (PBPK) model of the placenta (e.g., in silico placenta model). The in silico placenta model can be used for predicting species transport in the physical in vitro placenta device for subsequently altered conditions. Accordingly, certain test agents can be used in the in vitro placenta device to obtain data for testing a corresponding in silico placenta model. For example, the computationally modeled placenta can be created by obtaining in vitro transport data, and converting the in vitro transport data into synthetic in vivo transport data with the in silico placental PBPK model.

In some embodiments, one or more non-transitory computer readable media are provided that store instructions that in response to being executed by one or more processors, cause a computer system to perform operations, the operations comprising the method of one of the embodiments recited herein.

In some embodiments, a computer system can include: one or more processors; and one or more non-transitory computer readable media storing instructions that in response to being executed by the one or more processors, cause the computer system to perform operations, the operations comprising the method of one of the embodiments.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 15C shows Example 3, which includes determining the experimental dose of a test agent needed to achieve physiologically relevant or desired dosing in a target tissue, where the dose will go through the placental barrier (Step 1520).

Figure 1A:
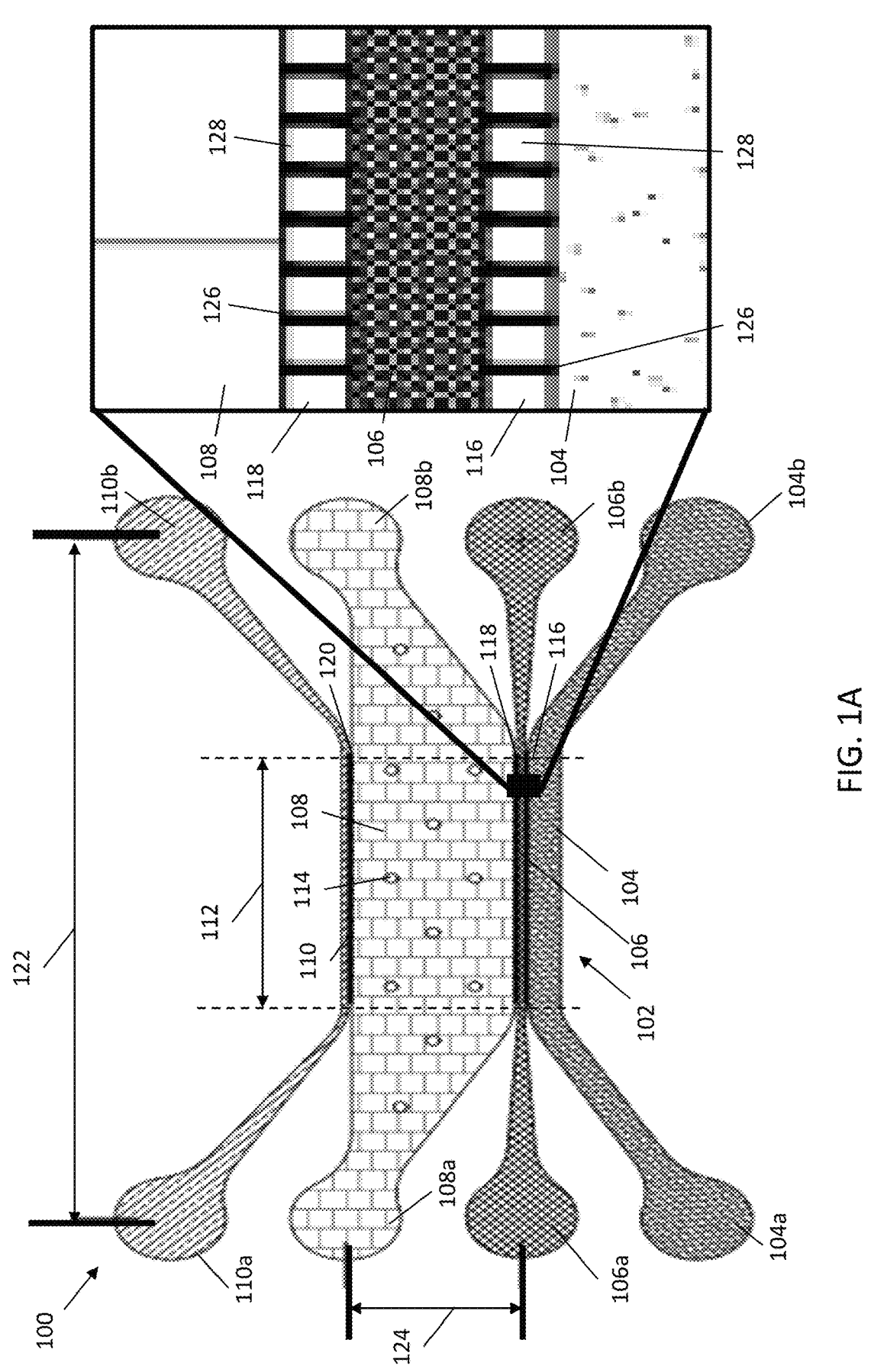
FIG. 1A includes a top view of a schematic of an embodiment of an in vitro placenta device.

The elements and components in the figures can be arranged in accordance with at least one of the embodiments described herein, and which arrangement may be modified in accordance with the disclosure provided herein by one of ordinary skill in the art.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, the present technology provides an in vitro placenta model in a device configuration for use in obtaining in vitro placenta data that correlates with in vivo data of a real placenta (e.g., real placenta data). The in vitro model device allows for obtaining in vitro data that is then modeled with a computing system to create an in silico model for a hybrid in vitro-in silico approach. The in vitro placenta device is configured as a microfluidic device with different chambers that cooperatively and accurately represent the complex physiology of the placental barrier. The operational configuration of the device contains: i) maternal and fetal vascular channels that are lined with placentally-sourced endothelial cells; and ii) a trophoblast chamber representing the placental barrier that separates maternal and fetal blood supplies. The device geometry and flow rate can be modulated, but are physiologically-based (e.g., chambers are sized to corresponding physical size) to ensure relevance of the in vitro data to in vivo placenta conditions. A native placenta-derived extra cellular matrix can be used in the in vitro placenta device to mimic the placenta in an in vivo environment. The placental barrier in the in vitro placenta device can be evaluated for viability, sustainability, and functionality as compared to placental explant data from literature or obtained from experiments. That is, the in vitro data from the in vitro placenta device can be correlated with in vivo data from a real placenta, which can be used to create an in silico model of the placenta (e.g., in silico placenta model). The microfluidic model can also include a fetal cell compartment (e.g., fetal circulation chamber) for evaluating specific fetal toxicities, such as neural, hepatic, cardiac, or the like.

The in vitro-in silico placental barrier hybrid framework comprises: i) a microfluidic in vitro model that recapitulates the placental environment at any timepoint in a pregnancy; ii) a multiphysics-based in silico model of the in vitro placenta device; and iii) gestational age-dependent physiologically-based whole body (PBWB) maternal and fetal models joined by a high-resolution gestational age-dependent model of the placental barrier.

The microfluidic in vitro placental barrier model provides microfluidic chips comprising a placental barrier architecture with flow channels that have key physiological dimensions and a pump system that provides flow rates that yield flow and transport patterns similar to those found in the in vivo placenta environment. The in vitro placenta device contains: i) a maternal vasculature channel in which endothelial cells (e.g., immortalized, primary or iPSC-derived) are cultured; ii) an intervillous space channel in which no cells or endothelial cells (e.g., immortalized, primary or iPSC-derived) are cultured; iii) a placental tissue chamber in which a mixture of cytotrophoblasts and syncytiotrophoblasts (e.g., immortalized, primary or iPSC-derived) are cultured; and iv) a fetal vasculature channel in which endothelial cells (e.g., immortalized, primary or iPSC-derived) are cultured. A porous architecture separates the channels/chambers, but allows communication via several, repetitive micronized gaps. Barrier integrity can be evaluated by permeability or resistance/impedance. Following exposure/insult, impact to barrier function can be evaluated and compared to normal conditions. As used herein, a channel has a chamber with an inlet and an outlet. The placenta barrier chamber, maternal and fetal chambers that are described herein can be provided as channels with inlets and outlets. The intervillous space chamber can be provided without inlets or outlets, but could also be provided as channels with inlets and/or outlets to control media supply or other control properties.

The in silico placenta model generated from the in vitro placenta device comprises a 3D rendering of the microfluidic in vitro device geometry with exact dimensions and a structured quadrilateral mesh. Computational domains of the in silico placenta model are specified identical to those described for the in vitro placenta device (e.g., maternal vasculature, intervillous space, placental tissue and fetal vasculature). Fluid flow and species-transport are characterized by the convection-diffusion equation and solved simultaneously using a multiphysics solver. Active transport is included using sink/source terms in the respective compartments.

The maternal and fetal PBWB models are in silico models comprised of multiple compartments representing the organs/organ systems in the maternal and fetal body. Model parameters, including organ volumes, blood flow rates, metabolic parameters and others are gestational age-dependent. Species transport and elimination are modeled using a system of ordinary differential equations, which are simultaneously solved using a multi-physics model solver. As described herein, the in silico placenta model can be configured as a maternal-fetal PBWB model.

The in vitro placental model can be correlated to a corresponding in vivo placenta model. This allows the in vitro placenta data to be used to develop maternal and fetal physiologically-based (PB) pharmacokinetic (PK) models, which can be connected through a high-resolution in silico placenta model. The maternal and fetal PBPK model can be adapted using software, such as CoBi tools. The combined PBPK in silico placenta model combined with the in vitro placenta device enables the prediction of maternal and fetal PK values for a range of test agents, such as those that are pharmaceutically relevant. For example, data obtained from in vitro experiments using the in vitro placenta device described herein can be used to characterize drug transport at the level of the whole placenta. Such an in vivo and in silico hybrid placenta model can be obtained by developing a first-principles based model of the in vitro placental barrier based on the in vitro placenta device to evaluate the predictive capability for use as a placenta transport model. The in silico placenta model can then be scaled up to the level of the whole placenta. As such, a scaling factor can be determined based on the data of the in vitro placenta device and real placenta data, in order to correlate the in vitro placenta data with real placenta data. The in silico placenta model can account for diffusive and active transport of a range of test agents. The development of this hybrid placenta model as a diagnostic and monitoring platform can aide in the prediction of impact of a chemical passing through the placenta and the downstream health effects in humans.

The invention addresses the need for a standardized platform that improves understanding of the placental barrier and enables prediction of placental drug transport in vivo without actually using a real placenta. This study combines modeling approaches to create a full understanding of the maternal and fetal exposure to drugs taken by a pregnant woman. These studies can aide in the safe and effective treatment of the medical needs of pregnant women, enabling the provision of guidelines for prescription of medications, and open up the possibility of therapeutically treating fetuses by maternal administration.

The combination of the in vitro placenta device and the computer-generated in silico placenta model provides the in silico-in vitro hybrid placenta system that builds upon validated in vitro models of the placenta for predicting exposure levels for different routes of administration and doses of one or more test agents. These computer simulated predictions are valuable because corresponding studies cannot be performed clinically, and in vitro placenta data for many agents can be lacking. The combination of the in silico-in vitro hybrid placenta system allows for predicting the pharmacokinetic profiles of a test agent (e.g., drug) in maternal plasma, fetal plasma, or organs and at the placental barrier. This hybrid placenta system allows for the in silico placenta model to generate synthetic in silico placenta data that can be used in determining appropriate doses for the safe treatment of a pregnant woman and her fetus.

The synergistic in vitro-in silico hybrid placenta model can be used for: i) evaluating compound transport of a test agent across the placental barrier and ii) predicting maternal and fetal compound exposure and toxicity of the test agent. The microfluidics-based placental barrier platform provided by the in vitro placenta device provides physiologically relevant data while enabling real-time morphological, pharmacokinetic and toxicological evaluations. For example, an imaging system, or any other assay system can be operably coupled with the in vitro placenta device so as to be able to obtain real time data thereof. The in silico model of the placenta can be generated based on the microfluidic in vitro placenta device platform. The in vitro and in silico hybrid placenta model can be used for predicting drug and nutrient transport based on compound physicochemical properties and tissue properties in combination with physics-based transport laws. This work builds upon previously validated and commercially available microfluidic 3D tissue platforms (e.g., SynVivo) and Computational Biology (CoBi) tools, which can be used to model physiological interactions.

Both the in vitro placenta device and in silico PBPK-placenta model are based on female anatomy and physiology collected from literature. All in vitro model dimensions are based on in vivo measurements. Physiological relevance is established by the presence of organ specific molecules (e.g., estradiol and hCG), which can be generated by the cells in the in vitro model. In addition, in vitro placenta device validation includes specific physiological values (e.g., hCG: 4,000-117,000 mIU/mL and estradiol: 6,100-3,400 pg/mL scaled based on surface area ratio) for these molecules based on scaling from the full-size placenta to the modeled barrier by the surface area ratio. For in silico PBPK and in vitro hybrid placenta model integration, a schematic that demonstrates the validated approach for the connection between in silico (e.g., computer compartmental model of placenta), in vitro placenta device, and in vivo placenta data is provided. The modeling of the in vitro placenta device itself is performed and compared to in vivo placenta data. The system allows for obtaining passive and active transport parameters from successive experiments, which can be scaled based on surface area or transporter expression to full-size placenta and act as input to the in silico placenta model. PBPK in silico placenta model results can be compared with PK profiles from explants and in vitro cell culture experiments to demonstrate validity. The scaling can take the size and data of the in vitro placenta device and map it to an in vivo placenta model, and a scaling factor or scaling function can be determined which can then be used to generate the synthetic in silico placenta data.

Cell morphology, proliferation and tight junction functionality are all endpoints that can be studied to determine whether or not they are dependent on a suitable ECM for the in vitro placenta device. Accordingly, the cells and ECM in each compartment of the in vitro placenta device can be configured to mimic the corresponding in vivo structure. The in vitro data is improved by using relevant physiological geometry and dimensions derived from in vivo architecture. In addition, physiological fluid flow values are used to drive controlled perfusion in the in vitro placenta device. Also, quantitative values for biomarkers can be used to validate the in vitro model relevance by comparison of those same biomarkers.

The placenta barrier function can be evaluated a number of ways. The in vitro placenta device can be used to evaluate real placenta barrier function by validating placenta barrier function of the in vitro device by exclusion of inulin and trypan blue from the fetal blood flow effluent, which can be evaluated by mass spectrometry. Also, the extent to which antipyrine and paracetamol permeate the placental barrier can be compared to data collected from placental explants and the in vitro placenta device's cell culture for the same drugs. Transport parameters can be normalized by surface area for the in vitro model, cell culture (well plate) model and explant models. As an alternative, the system can evaluate glucose transport, which is facilitated by diffusion via hexose transporters (e.g., GLUT3 and GLUT1).

Accordingly, the in vitro placenta device can be validated using a known test agent for comparison with data for that known test agent in a real placenta. The correlation between in vitro placenta data and real placenta data provides a basis for studying various test agents with the in vitro placenta device described herein, so that the in silico placenta model can be used for these various test agents to generate relevant placenta data without using a real placenta.

In Vitro Placenta Device

Figure 1B:
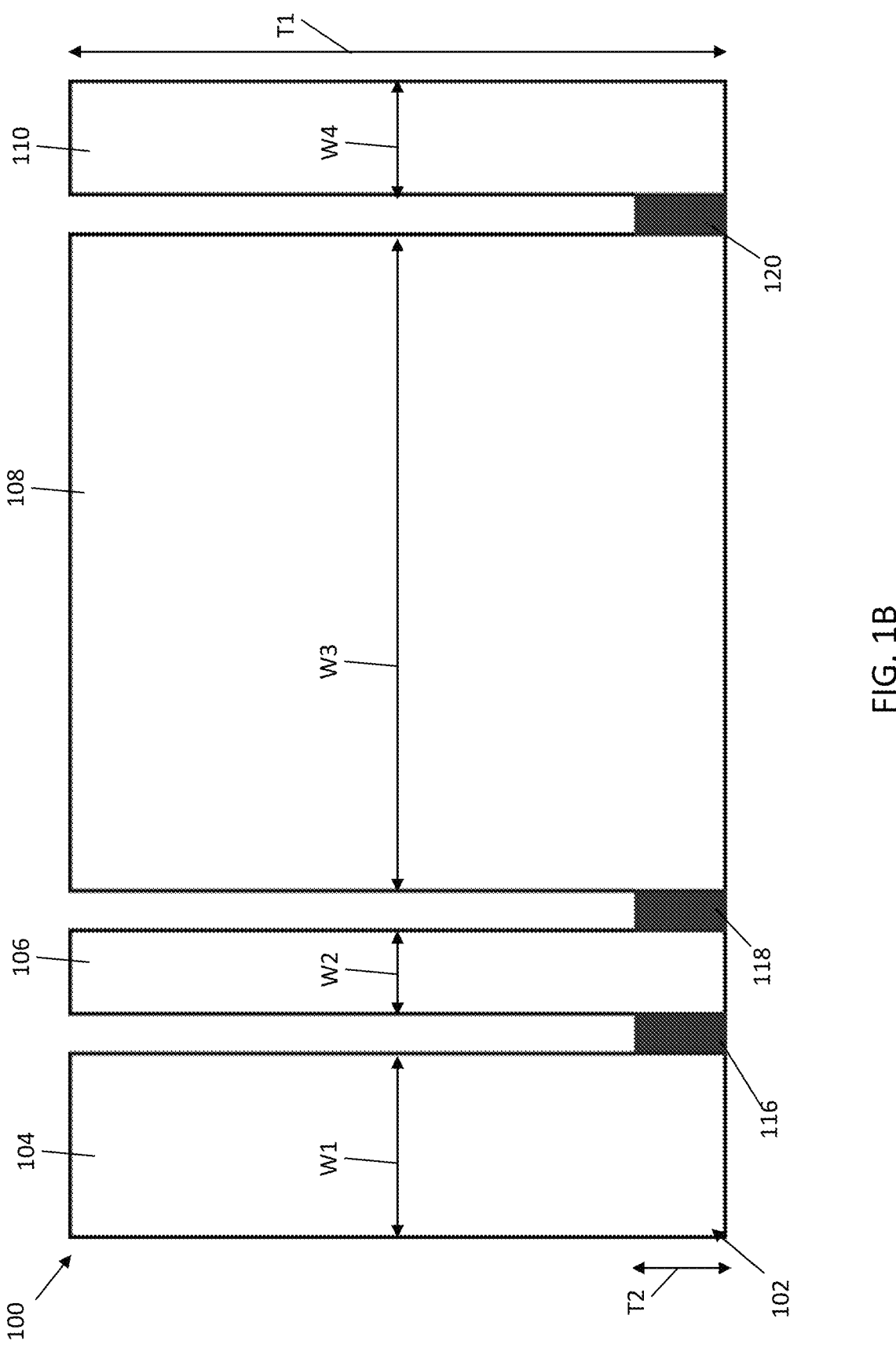
FIG. 1B includes a cross sectional view of an embodiment of the in vitro placenta device of FIG. 1A.
Figure 1C:
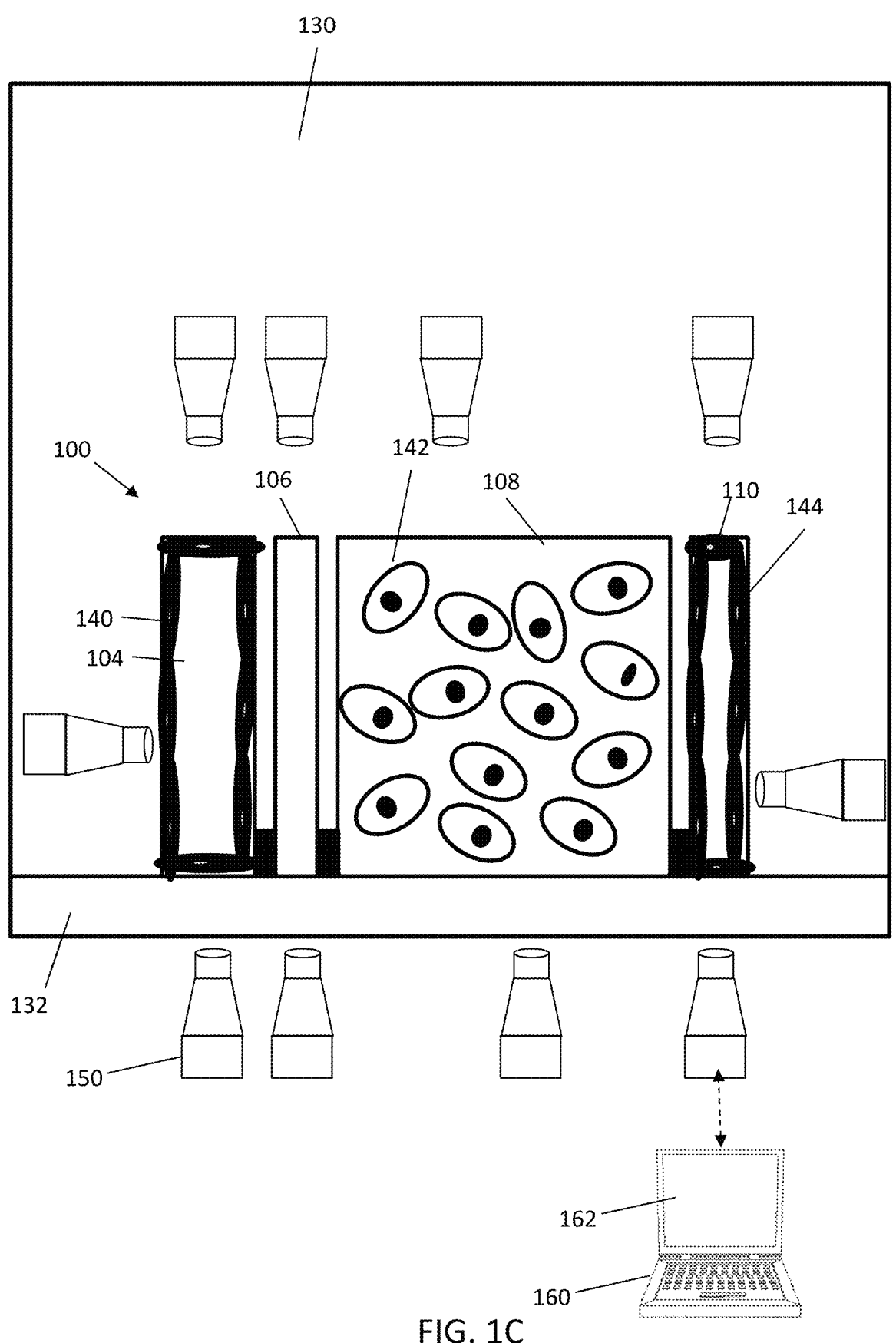
FIG. 1C includes a cross sectional view of a functionalized schematic of an embodiment of an assay system having the in vitro placenta device of FIG. 1A.

An embodiment of the in vitro placenta device 100 is shown in FIGS. 1A-1C. FIG. 1A includes a top view of the in vitro placenta device 100 having the microfluidic network 102 that includes the maternal circulation chamber 104, intervillous space chamber 106, placental barrier chamber 108, and fetal circulation chamber 110. The maternal circulation chamber 104 is shown to include an inlet 104a and an outlet 104b, with the cell culture region therebetween, which is the region between the marker lines for the assay region 112. As shown, the assay region 112 can be about 5.2 mm across, but can vary as described herein. The intervillous space chamber 106 is shown to include an inlet 106a and an outlet 106b, with the cell culture region or spacer region therebetween, which is the region between the marker lines for the assay region 112. Accordingly, the intervillous chamber 106 may include a cell culture, or can be a cell-free void space with or without extracellular matrix material (e.g., natural or synthetic), or other biological molecules or hydrogels. The placenta barrier chamber 108 is shown to include an inlet 108a and an outlet 108b, with the cell culture region therebetween, which is the region between the marker lines for the assay region 112. Additionally, structural posts 114 (SP) are shown in the placenta barrier chamber 106 within the placenta barrier cell culture region. Fetal circulation chamber 110 is shown to include an inlet 110a and an outlet 110b, with the cell culture region therebetween, which is the region between the marker lines for the assay region 112.

The chambers are separated by porous walls, such as a first porous wall 116 separating the maternal circulation chamber 104 from the intervillous space chamber 106, a second porous wall 118 separating the intervillous space chamber 106 and the placenta barrier chamber 108, and a third porous wall 120 separating the placenta barrier chamber 108 and the fetal circulation chamber 110. The dimension from inlet to outlet for the microfluidic length 122 can be 14 mm across, but can vary as described herein. Also, the placenta barrier chamber 108 is shown to have a transport dimension 124 from the second porous wall 118 to the third porous wall 120. The transport dimension 124 can be 2.7 mm across, but can vary as described herein. Notably, a plurality of the in vitro placenta devices 100 can be used together in a system, such as in an any series or parallel, or combination thereof.

FIG. 1A also shows the individual pore channels 126 in the porous walls (e.g., 116, 118, 120), which can have a width of 5 microns, but can vary as described herein. The pore channels 126 can be separated from each other by a wall sections 128, which can have a width of 50 microns, but can vary as described herein.

FIG. 1B shows a side view of a schematic representation of the in vitro placenta device 100 of FIG. 1A. As shown, the maternal circulation chamber 104 has a width W1 across of 500 microns, the intervillous space chamber 106 has a width W2 of 100 microns, the placenta barrier chamber 108 has a width W3 of 2500 microns, and the fetal circulation chamber has a width W4 of 90 microns. The maternal circulation chamber 104, intervillous space chamber 106, placenta barrier chamber 108, and fetal circulation chamber 110 can all have a thickness T1 (e.g., height) of 100 microns. FIG. 1B also shows that the porous walls 116, 118, 120, all have a width of 50 microns and a thickness T2 of 8 microns. However, these dimensions can be varied as described herein.

FIG. 1C shows a substrate 130 having the in vitro placenta device 100 formed therein, and a glass slide 132 (or other lid) on a side. The maternal circulation chamber 104 is shown to have a maternal circulation cell culture 140. The intervillous space chamber 106 is shown to be devoid of a cell culture, but it could include cells, such as blood cells (e.g., red, white) and blood components (e.g., proteins) as well as some maternal endothelial cells or even a small number of placenta barrier cells. The placenta barrier chamber 108 is shown to have a placenta barrier cell culture 142. The fetal circulation chamber 110 is shown to include a fetal circulation cell culture 144. The substrate 130 can be PDMS or other biocompatible structural material. The glass slide 132 can be glass or plastic, such as PDMS.

The microfluidic in vitro placental barrier model is shown to include four fluidic channels separated by three porous barriers in a side-by-side architecture. The porous barrier between the channels has 5 μm slit pores spaced 50 μm apart from each other, which permits cell-cell communication and diffusion of signaling molecules and various chemical compounds. The placental tissue chamber is reinforced by 200 μm diameter support posts 114 (SP) to avoid collapse under fluidic flow and pressure. Unlike traditional microfluidic devices, channel thicknesses were selected based on dimensions of the human placental environment at any gestational period throughout the term of pregnancy.

The in vitro placenta device can include a disposable and optically clear microfluidic chip containing 3D cultured trophoblasts (e.g., placenta barrier cell culture) and endothelial cells (e.g., maternal and fetal circulation cell cultures), in physiological dimensions that accurately capture in vivo architecture. The in vitro placenta device more accurately reproduces the in vivo microenvironment, which provides a physiologically relevant testing system for test agent exposure and toxicity analysis. The configuration of the device and use of PDMS (polydimethylsiloxane) that is optically clear provides the ability for real-time, high content, quantitative imaging of endothelial cell and trophoblast interactions, as well as the responses of trophoblasts to endothelial-mediated drug exposure and biological secretions. The microfluidic device can also include the maternal and fetal endothelium contribution to placental transport resistance. Finally, the device employs a native placenta-derived extracellular matrix (ECM) for optimal and realistic culture conditions enabling physiologically relevant behavior.

FIG. 1C also shows cameras 150 that can be placed outside of the glass slide 132, outside the substrate 130, or embedded in the substrate 130 (e.g., in etched regions). The cameras 150 can be communicatively coupled with a computing system 160 configured as a controller and to receive optical data from the cameras 150. The cameras 150 can take still images or videos of the different chambers of the in vitro placenta device. While a number of cameras 150 are shown in an arrangement, the placement and number of cameras can be modified in order to obtain the desire data, where more or fewer cameras can be used. As such, the entire device or select regions of interest can be imaged with the imaging system. The computing system 160 can be communicatively coupled with the cameras 150 by wire, optics, or wireless communication networks, represented as the dashed lines. The computing system 160 can include a display 162 for visually showing the images obtained from the cameras 150.

The invention comprises a device, which can be referred to as an in vitro placenta device, lab-on-a-chip placenta device, or placenta-on-a-chip device, designed for the purpose of analyzing a biological structure of a placenta. This device is composed of several interconnected systems and components.

The first main component is the maternal circulation system, configured as a microvascular network or microchannel network. This system is designed to mimic the maternal blood flow in a real placenta. It is connected to a microfluidic network with one or more pumps (e.g., microfluidic pumps or micropumps), and optionally one or more reservoirs, such as a cell culture media reservoir, test agent reservoir, positive control reservoir, or negative control reservoir. The output from this system is fluid that is directed towards the next component, the intervillous space.

The intervillous space, also referred to as a blood pool or blood reservoir, is designed to mimic the space in a real placenta where maternal blood pools and exchanges nutrients and waste with the fetal blood. This space is also connected to the a network and devices as the maternal circulation system. The output from this space is fluid that is directed towards the next component, the placenta barrier.

The placenta barrier, also known as a maternal-fetal interface model or maternal-fetal barrier model, is designed to mimic the barrier in a real placenta that separates maternal and fetal blood while allowing the exchange of nutrients and waste. This placenta barrier is also connected to the same fluidic network and devices as the previous components. The placenta barrier includes several types of cells, such as placental cells or placental tissue cells, such as trophoblast cells, which play crucial roles in nutrient and waste exchange. The output from this placenta barrier is fluid that is directed towards the final main component, the fetal circulation system.

The fetal circulation system is designed to mimic the fetal blood flow in a real placenta. It is connected to the same fluidic network and devices as the previous components. The output from this system is fluid that is directed towards collection devices in the fluidic network, such as waste collection devices.

Each of these main components and their sub-components work together to enable the device to accurately mimic the structure and function of a real placenta, allowing for detailed analysis and study. The device also includes a viewing window, or observation window, which provides visibility into the systems and spaces, facilitating the monitoring and examination of the processes occurring within the device.

Figure 2:
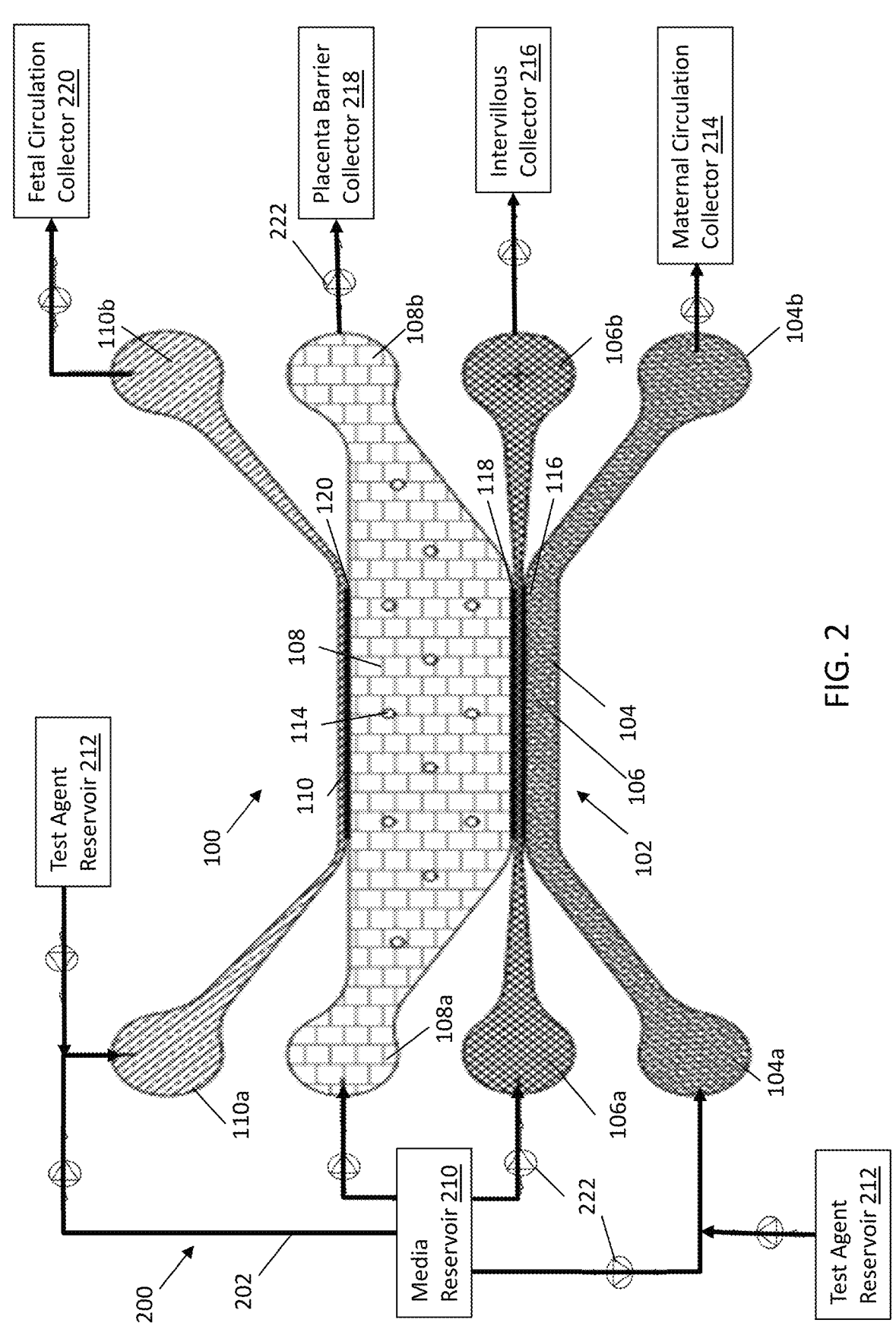
FIG. 2 includes a schematic of an embodiment of a fluidic system for the in vitro placenta device of FIG. 1A.

FIG. 2 shows an exemplary system 200 that includes the in vitro placenta device 100. As shown, a fluidic network 202 including a media reservoir 210 feeding the maternal circulation chamber 104, intervillous chamber 106, placenta barrier chamber 108, and the fetal circulation chamber 110, which can include one or more pumps 222 to facilitate fluid flow. However, each chamber may have its own media reservoir, which can include a specialized media configured for the cell culture therein, such as growth factor, or other biomolecules. Also, a test agent reservoir 212 is shown to feed into the maternal circulation chamber 104 and/or the fetal circulation chamber 110. The test agent reservoir 212 can include test agents to be used in the methods described herein on monitoring the placenta barrier and transport properties thereof. Any number of test agent reservoirs 212 can be used for any number of test agents. The test agents can be any type of test agent, such as those described herein.

FIG. 2 also show the outlet of each chamber coupled to a particular collector, which can include one or more pumps 222 to move the fluid. The pumps 222 can be used to precisely control the fluid flow through the channels and chambers. The material circulation chamber 104 is connected to a maternal circulation collector 214 adapted to collect the fluid from the outlet 104b. The intervillous space chamber 106 is connected to an intervillous collector 216 adapted to collect the fluid from the outlet 106b. The placenta barrier chamber 108 is connected to a placenta barrier collector 218 adapted to collect the fluid from the outlet 108b. The fetal circulation chamber 110 is connected to a fetal circulation collector 220 adapted to collect the fluid from the outlet 110b. Various valves or other fluidic network components can be included, such as heaters, coolers, or the like. The components of the system 200 can be controlled by the computing system 160.

The microfluidic in vitro placenta devices can be fabricated using standard PDMS soft-lithography techniques as known. CAD drawings of the microfluidic placental barrier device geometry can be generated to create SU-8 silicon molds, and device architecture is realized by casting with PDMS. Inlet and outlet ports are punched into the PDMS mold and then the structure is then bonded to clean glass slides to form the final microfluidic chip prototypes. Alternatively, the glass slides can be configured as lids or covers for the microfluidic network.

Figure 3A:
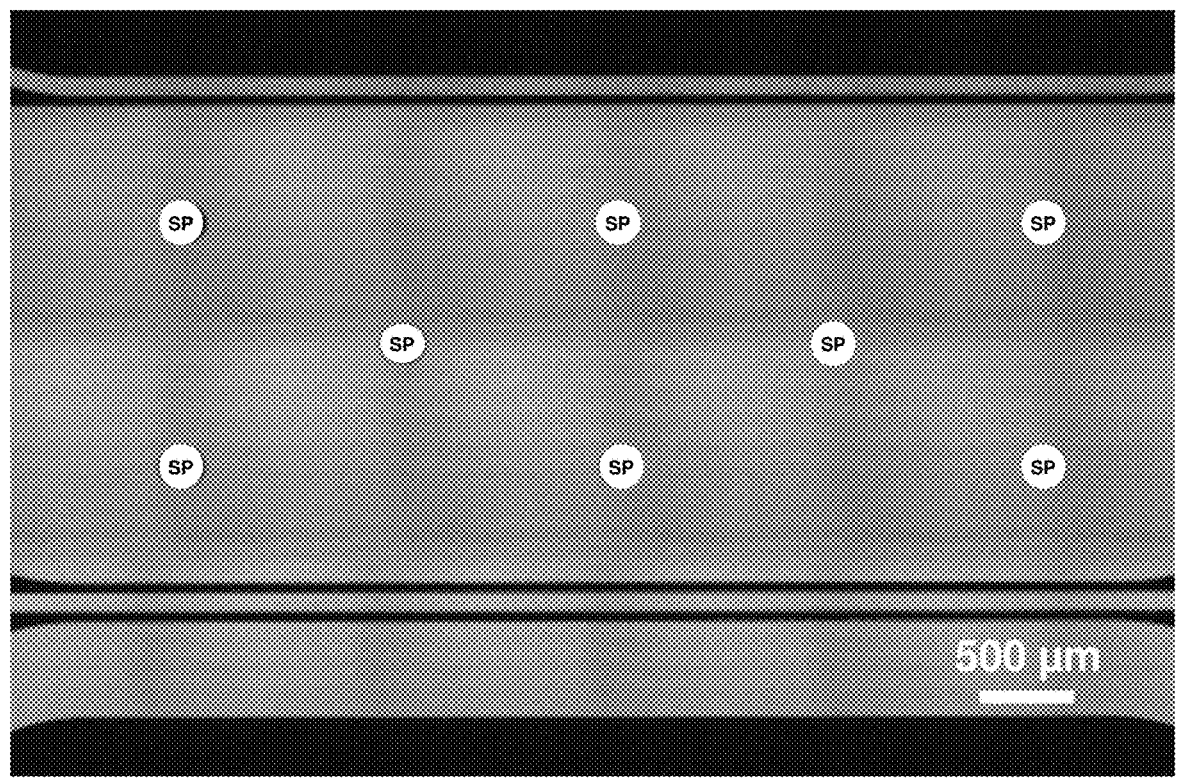
FIG. 3A shows an example in vitro placenta device where a fabricated device is filled with fluorescein sodium salt to demonstrate no leakage.
Figure 3B:
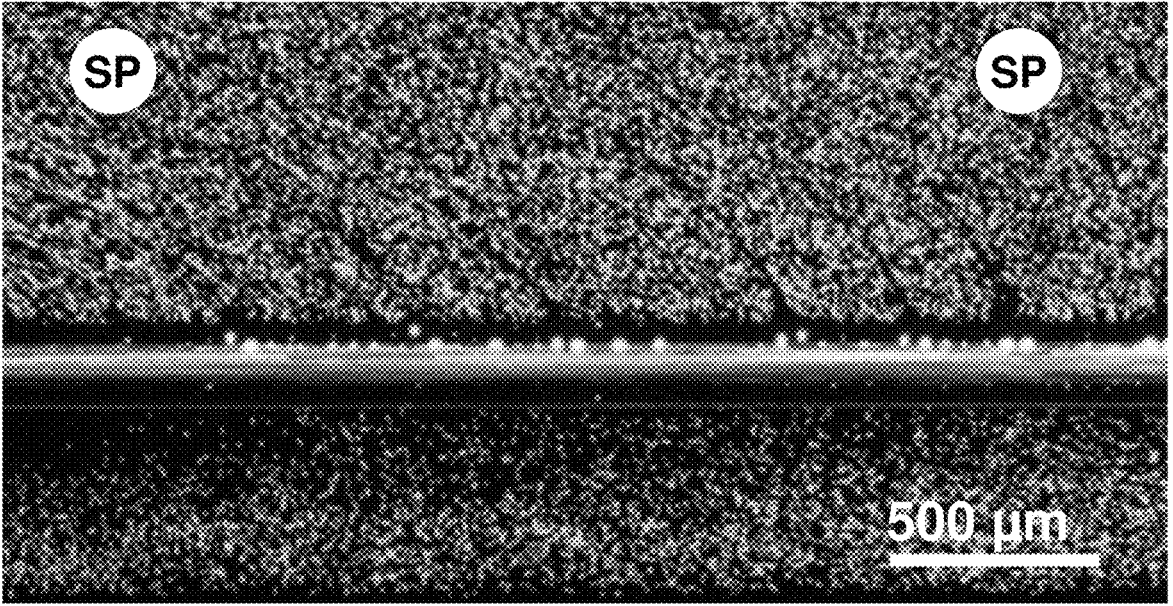
FIG. 3B shows another example in vitro placenta device, where the barrier integrity is tested for size exclusion by perfusing the intervillous space channel with a mixture of 2 and 6 μm particles.

The integrity of the device and porous barriers can be evaluated by perfusion with fluorescent dye or particles. FIG. 3A shows an example where a fabricated device is filled with fluorescein sodium salt to demonstrate no leakage. FIG. 3B shows another example, where the barrier integrity is tested for size exclusion by perfusing the intervillous space channel with a mixture of 2 μm and 6 μm particles. The smaller particles freely diffuse across the slit barrier, while the larger particles are retained, indicating a fully functional 5 μm porous architecture. The flow is from left to right. The "SP" are the support posts as defined herein. Thus, the device functions as designed.

In Vitro Placenta Device Coatings and Cultures

The in vitro placental model devices are primed with sterile phosphate buffer solution (PBS) by injection into each of the channels. All chambers of the microfluidic placental barrier device may be coated with various proteins or substrates, creating an extracellular matrix to support the attachment and growth of cells on inner surfaces of the chambers. Example substrates include, but are not limited to, fibronectin, collagen and lyophilized placental extracellular matrix (ECM). The methods for coating various surfaces (e.g., glass, plastic) with proteins and other substrates are well known in the field. Cells, such as trophoblasts (e.g., placenta barrier culture) or vascular endothelial cells (e.g., maternal and/or fetal circulation chambers), may be cultured on the coated inner surfaces of the relevant chambers to study species transport from fetal or maternal circulation into the placenta. Virtually any type of trophoblast (e.g., cytotrophoblasts, syncytiotrophoblasts, villous trophoblasts, etc.) or endothelial cell (e.g., human umbilical vein endothelial cells (HUVEC), microvascular placental endothelial cells (MPEC), etc.) may be cultured in the microfluidic placental barrier model devices. These cells may also be cocultured or tricultured.

In some embodiments, all channels of the device can be coated with human fibronectin to facilitate cellular attachment. For example, Bewo 30, a placental cytotrophoblast cell line, can be seeded on Day 0. After 24 hours, differentiation to syncytiotrophoblasts can be induced chemically (e.g., with forskolin) according to previously established protocols. Media can be subsequently refreshed in the placental tissue chamber every 24 hours over the next 3 days. HUVEC can be seeded into the maternal and fetal circulation channels at 48 hours. HUVECs can be harvested, concentrated to $1 \times 10^7$ cells/mL and injected into the maternal channel via a remote head syringe pump at 5 μL/min until cells are homogenously distributed. Devices can then be incubated at 37° C., 5% $CO_2$ for 4 hours to allow for attachment. The fetal side can then seeded at $6 \times 10^7$ cells/mL using a flow rate of 3 μL/min until cells are homogenously distributed. Again, devices can be placed in the incubator. Vascular channel perfusion can be activated in the maternal channel and cells can be cultured under shear via intermittent media change (3 μL/min for 4 min every 4 h). The fetal channel can be connected to flow 4 hours later and cultured under shear via intermittent media change (0.5 μL/min for 4 min every 4 h). The following day, both maternal and fetal vascular channels can be subjected to a step protocol (Maternal: 0.01 μL/minute to 1 μL/min over 20 h and 10 steps, Fetal: 0.01 μL/minute-0.1 μL/min over 20 h and 10 steps) to induce constant shear. Thus, the devices can be configured with cells and media for use in the placenta barrier assays, such as studying placenta barrier transport with test agents introduced into the maternal and/or fetal circulation systems for testing transport across the placenta barrier.

Figure 4:
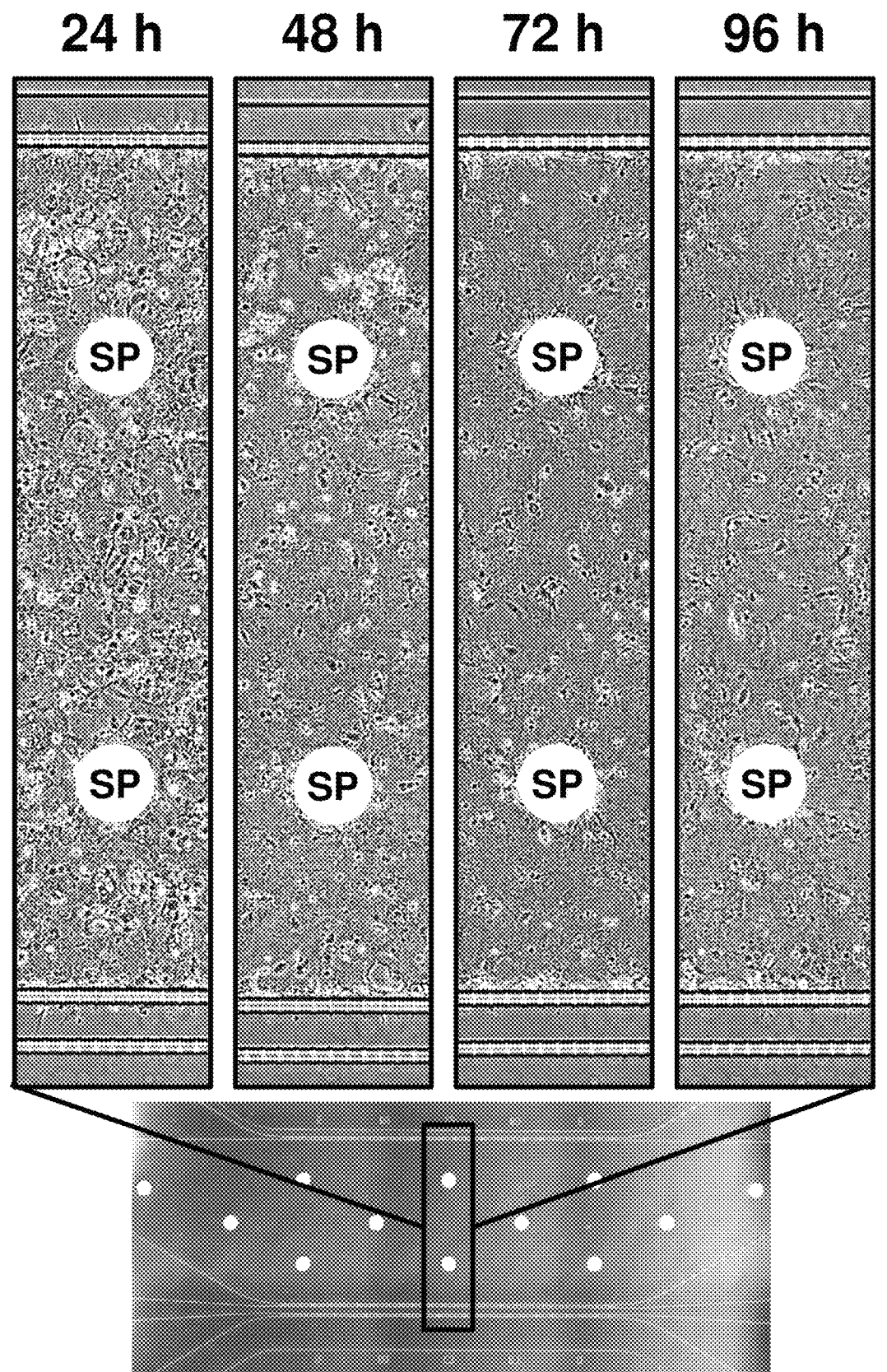
FIG. 4 illustrates imaging of the in vitro placenta device during use in an assay at different time points, where the images can show the cells in each of the chambers, and can show labeled test agents.

In some embodiments, an assay can be performed with the in vitro placenta device for characterization of cell cultures in the chambers of the microfluidic device. Cell morphology (e.g., Bewo culture) and cell-cell interactions can be observed microscopically in real-time throughout all experiments (see, FIG. 4). As shown, the imaging system can be used to monitor the device so that the cultures can be visualized as shown. The support posts (SP) are shown are reference, such that the entirety of the chambers and device can be imaged. For example, FIG. 4 shows the evolution of the cell culture in the same slice of the device as shown over 24 h, 48 h, 72 h, and 96 h.

Additionally, end point assays such as those for viability, phenotypic protein expression, metabolic activity, gene expression, and the like can be assessed on- or off-chip. For example, fluidic samples can be obtained at the outlet of each chamber throughout an assay and/or cell samples can be obtained after an assay for biomarker profile analysis. Along with visualization, and sample analysis assay can be used with samples obtained from the different compartments. The biochemical analysis along with the visual analysis can be useful in modeling the in vitro system.

Figure 5:
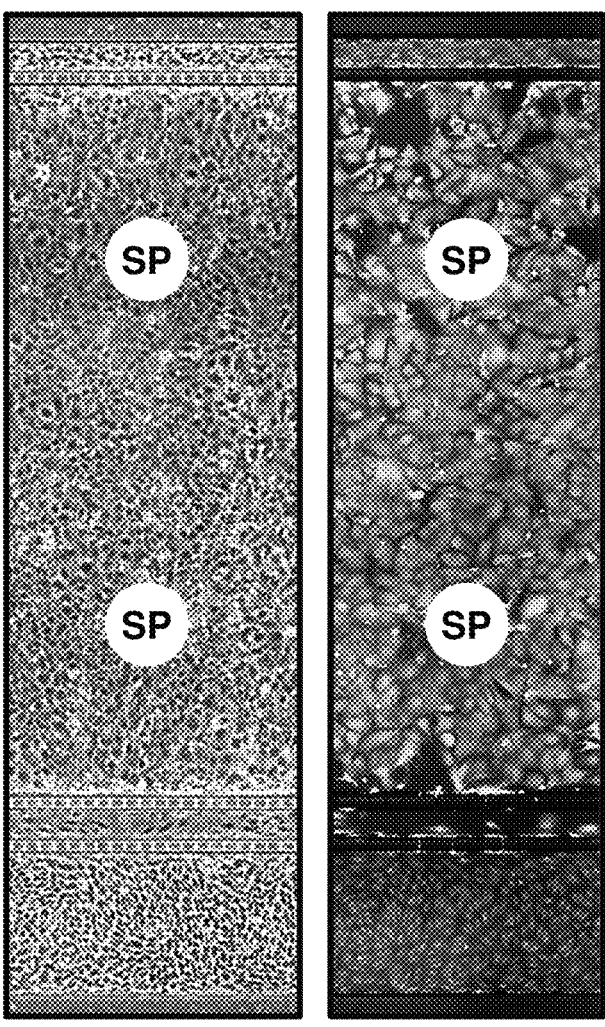
FIG. 5 illustrates viability of cells in the in vitro placenta device during assay conditions.

Viability can be assessed on-chip as an endpoint. Devices are prepared for viability quantitation by incubation with calcein AM and ethidium homodimer in PBS. After rinsing the cells with PBS, fluorescent images are taken via microscope (see, FIG. 5). Live and dead cells (e.g., co-culture of Bewo placental trophoblasts and HUVEC maternal and fetal endothelial cells) are visualized using FITC and TRITC filters, respectively.

Figure 6:
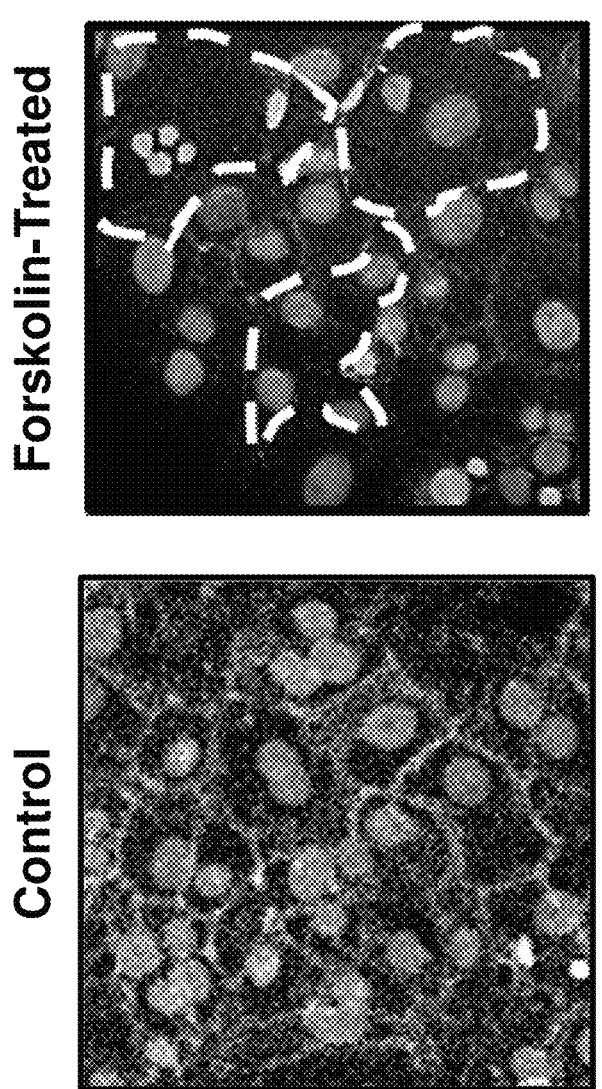
FIG. 6 includes images of decreased expression of E-cadherin was readily observed in forskolin-treated cultures and without (control).

Differentiation can be assessed in through multiple assays, such as immunocytochemistry, gene expression, or the like. One such approach involves showing the presence of syncytia, which are readily observed in syncytiotrophoblasts. When cytotrophoblasts undergo differentiation to syncytiotrophoblasts, E-Cadherin, an adherns junction protein that mediates calcium-dependent adhesion in neighboring cells, is markedly decreased. Syncytia formation can be assessed on chip as an endpoint by immunocytochemistry (ICC) staining. One implementation showed differentiation after 96 hours in culture, where cells were rinsed, fixed and permeabilized/blocked according to previously developed protocols. Cells were incubated in sequence with primary and secondary antibodies and then counterstained. Images for forskolin-treated and control conditions were compared for qualitative evaluation of syncytialization. As expected, decreased expression of E-cadherin was readily observed in forskolin-treated cultures (see, FIG. 6). To quantify the extent of syncytialization, the fusion index (f) was calculated as the ratio of the total number of nuclei in syncytia to the total number of nuclei, similar to previous approaches[5].

Figure 7:
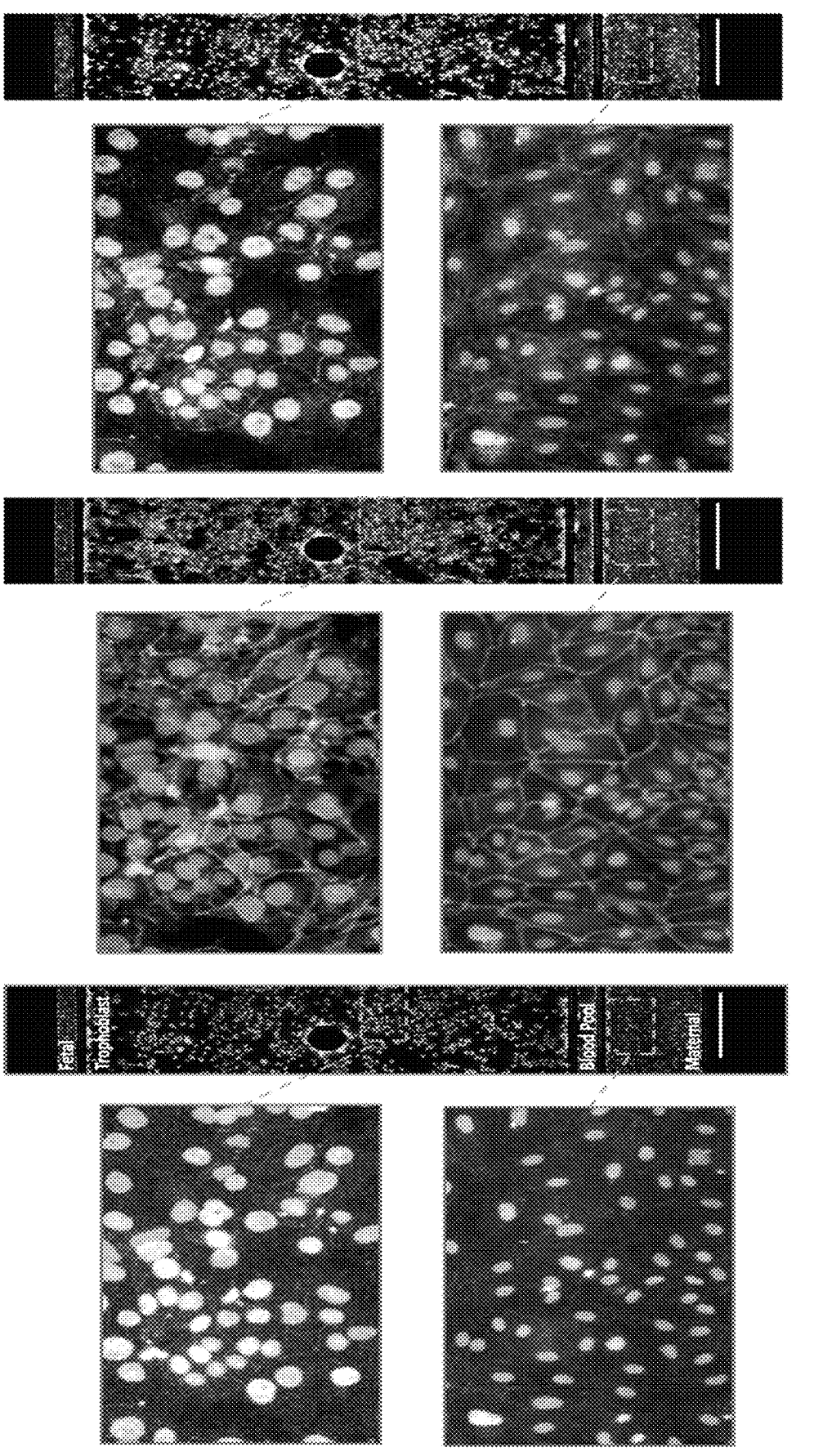
FIG. 7 includes images of cell cultures in the in vitro placenta device forming tight junctions under physiological conditions.
Figure 8A:
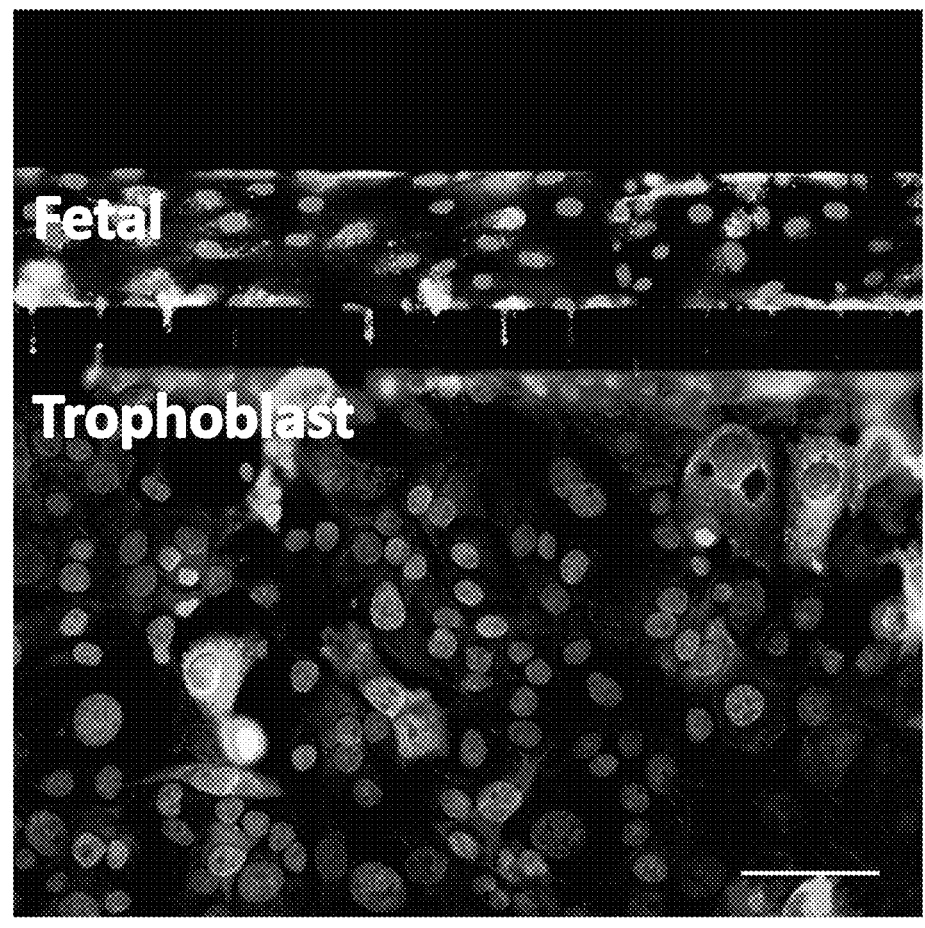
FIGS. 8A-8D include images of the in vitro placenta device that show vWF is only present in the EC channels, and both hCG and CK8 are present only in the trophoblast channel.
Figure 8B:
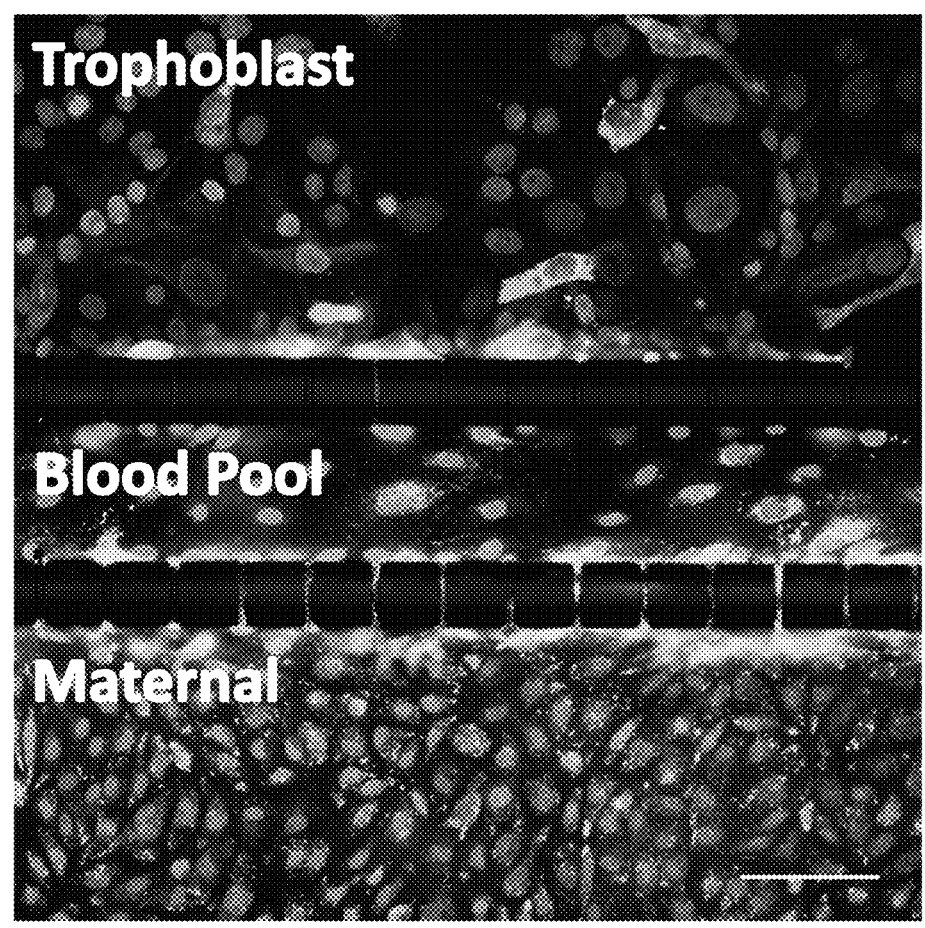
Figure 8C:
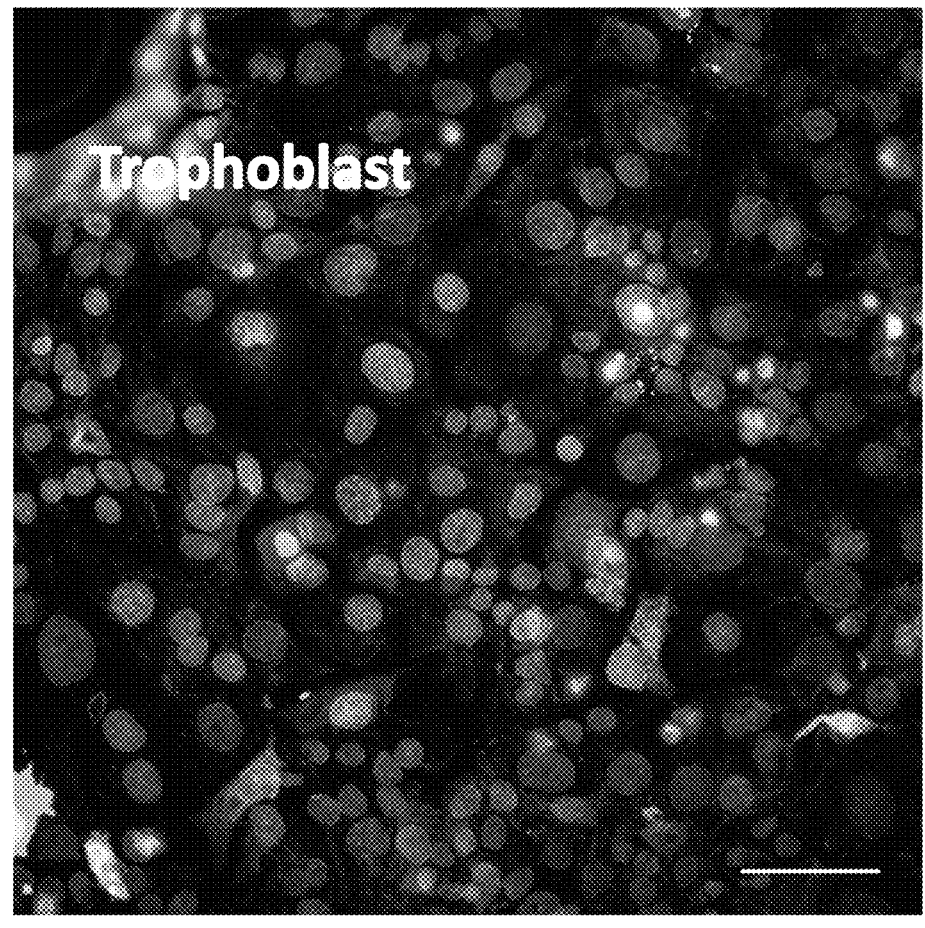
Figure 8D:
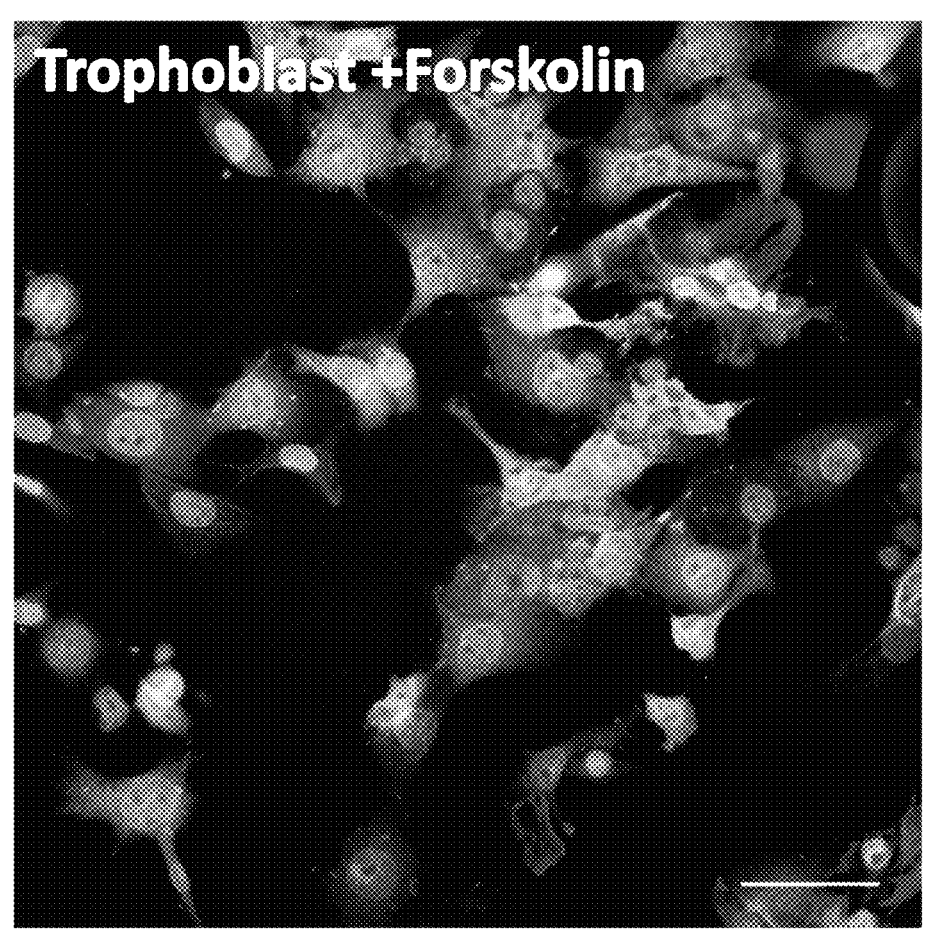

In some embodiments, the in vitro placenta device can be used for cell characterization. ICC staining is typically used to characterize cells/tissues and evaluate phenotypic expression. For example, in the coculture tight junction formation is evaluated in the vascular and placental tissues using antibodies such as VE-Cadherin, CD31 and ZO-1. After 96 hours in culture, cells can be rinsed, fixed and permeabilized/blocked according to previously developed protocols. Cells can be incubated in sequence with primary and secondary antibodies and then counterstained. Images for forskolin-treated and control conditions can be compared for qualitative phenotypic characterization. VE-Cadherin, CD31 and ZO-1 has been shown to be expressed in both HUVEC and differentiated Bewo 30 cells (see, FIG. 7), indicating functional tight junction formation under the defined physiological conditions. To confirm cell type-specific characterization, cocultures can be incubated with anti-human Von Willebrand factor (vWf), a glycoprotein exclusive to ECs, anti-human hCG, a compound produced primarily by syncytiotrophoblasts, and cytokeratin 8 (CK8), a trophoblast-specific marker. After 96 hours in culture, cells can be rinsed, fixed and permeabilized/blocked according to previously developed protocols. Cells can be incubated in sequence with primary and secondary antibodies and then counterstained. Images for forskolin-treated and control conditions can be compared for qualitative phenotypic characterization. FIGS. 8A-8D show vWF is only present in the EC channels, and both hCG and CK8 are present only in the Trophoblast channel. Characterization of coculture model is shown via ICC staining with vWf (green), hCG (orange), CK8 (red), and Hoechst 33342 (blue), but greyscale in the figures. The vWF is not shown in the trophoblast channel, and neither hCG nor CK8 are present in the vasculature, confirming no non-specific binding and cell specificity. The scale bar is 100 μm.

In some embodiments, the in vitro placenta device can be used to model placental barrier function. The placental barrier (e.g., including the maternal and fetal vasculature) functions by preventing specific chemicals from crossing the barrier. The present in vitro placenta device can be used to study mechanisms of exclusion include size, net charge, lipophilicity, active transport, and the like. Differences in fetal-placental and maternal-placental transport have also been described in the literature, which can be compared to the in vitro placenta data. Permeability assays using chemicals with these various physicochemical properties can be conducted to evaluate barrier function of the in vitro placenta device.

Figure 9A:
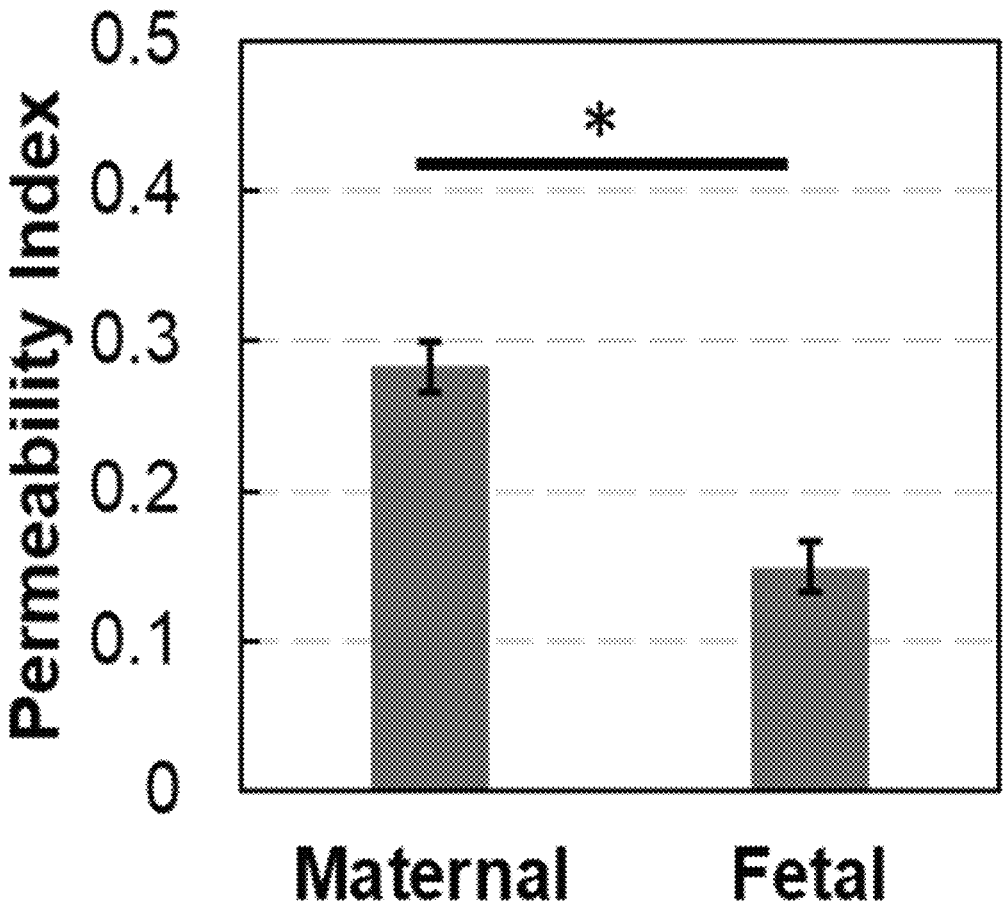
FIG. 9A includes a graph of data that shows the permeability index (PI) from the fetal circulation compartment versus the maternal circulation compartment.

For example, one embodiment of the present invention was tested for differences in fetal-placental and maternal-placental permeability, where a 4 kD TRITC-Dextran solution was injected into the vascular channel (maternal or fetal) at 0.1 μL/min for 1 hour. Endpoint images were taken and the permeability index (PI) was determined as the ratio of the sum ROIs in the trophoblast to vascular channel. The PI from the fetal circulation compartment versus the maternal circulation compartment were compared (FIG. 9A). Reduction in PI from the fetal side is expected due to the smaller size of the fetal capillaries which creates a significant component of permeability restriction[6]. The mean maternal PI was approximately 2-fold higher than from the fetal vasculature. The permeability index values are from coculture experiments that were compared when injecting FSS from the maternal versus fetal side.

Figure 9B:
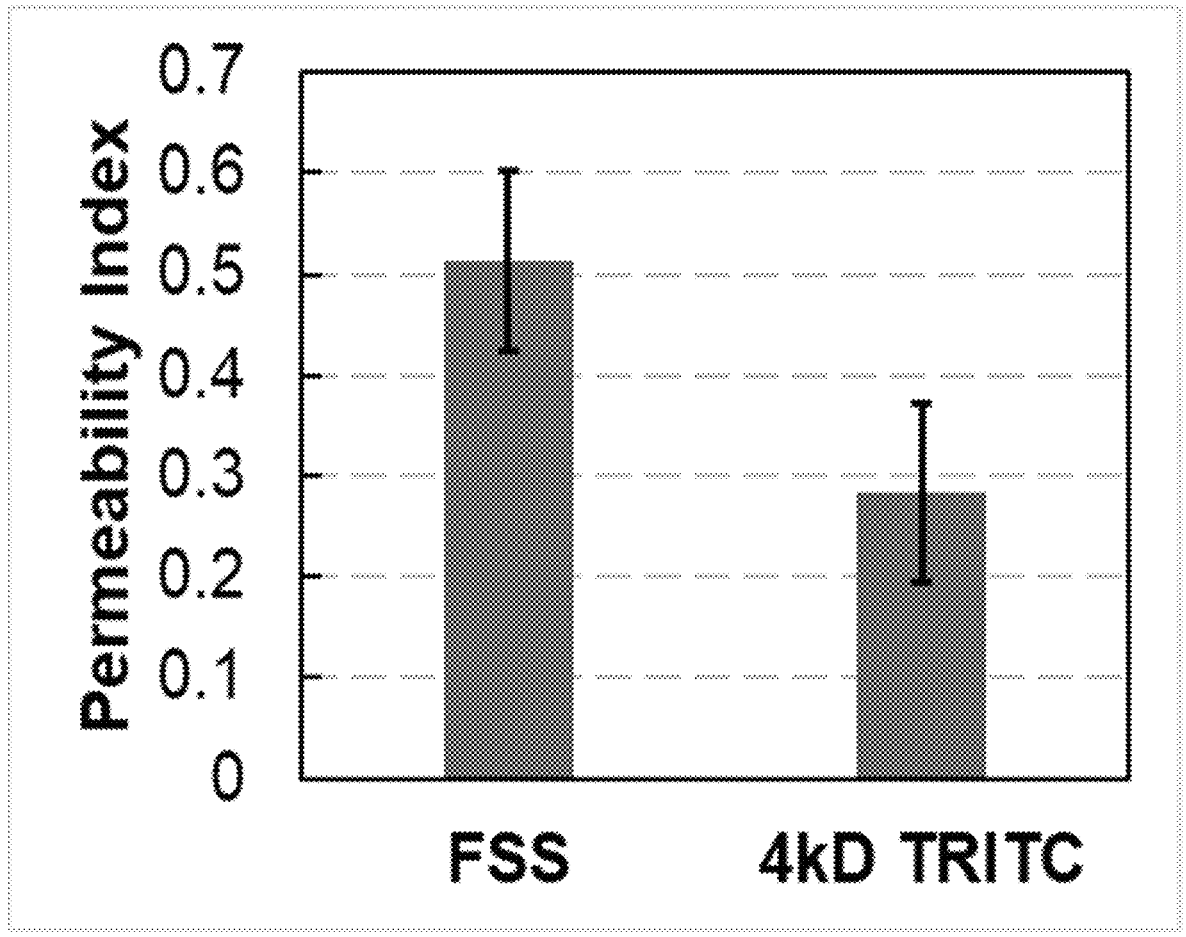
FIG. 9B includes a graph of data that shows the PI for FSS versus r4 kD TRITC

In another example, one embodiment of the present invention was used to evaluate maternal-placental size exclusion, where a fluorescein sodium salt (FSS) solution was injected into the maternal vascular channel at 0.1 μL/min for 1 hour. Endpoint images were taken and the PI was determined as the ratio of the sum ROIs in the trophoblast to maternal vascular channel. PI was expected to decrease as a function of compound molecular weight. A nearly 2-fold increase in the average PI was observed for FSS compared to 4 kD TRTIC-dextran (see, FIG. 9B). This demonstrates size-dependent permeability.

In some embodiments, the in vitro placental model device can be used for studying toxicity of test agents to the placenta. Certain compounds not only induce fetal toxicity upon crossing the placental barrier, but also disrupt the barrier itself. The microfluidic placental barrier model can be used to study response to toxic exposure of test agents. The impact to barrier function can be assessed through permeability comparisons and toxicity (e.g., cytotoxicity, etc.) can be assessed off chip by various methods (e.g., cell lysate luminescence assay, genomic analysis, etc.).

Figure 10:
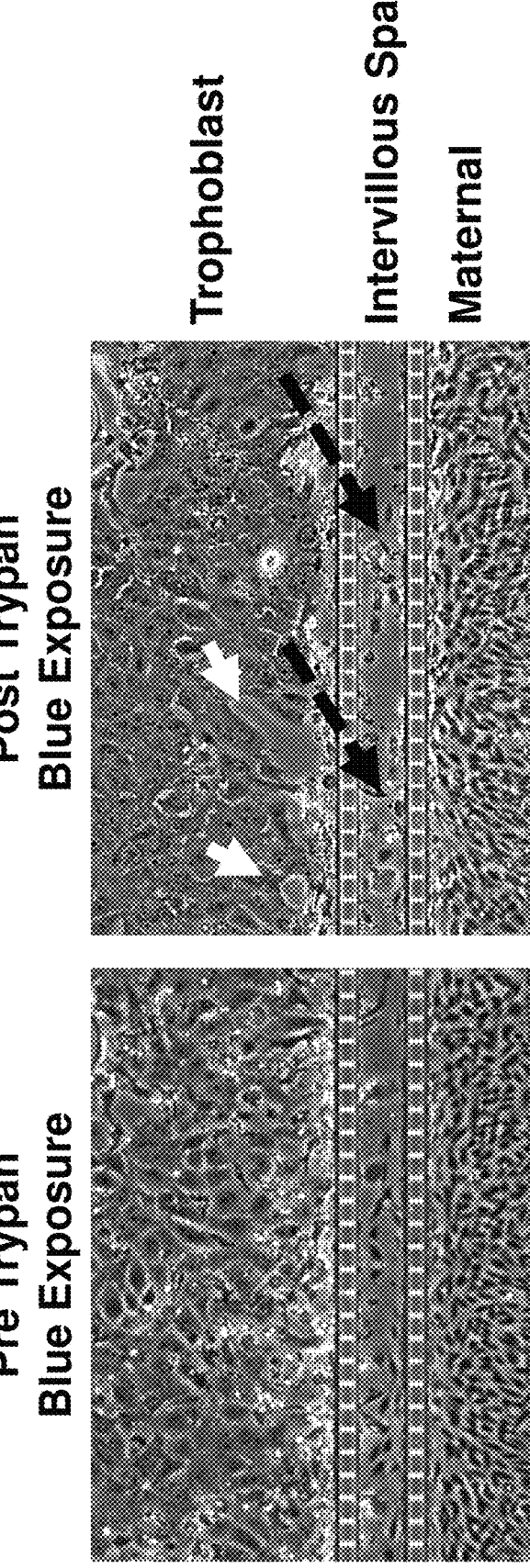
FIG. 10 includes images that show the effect of trypan blue exposure to the cells in the chambers of the in vitro placenta device.

For example, an in vitro placenta device was exposed to trypan blue by injection into the maternal channel at 3 μL/min for 4 min and then incubated at 37° C. for 15 min, similar to protocols in literature[7,8]. The morphological effects of trypan blue exposure were readily observed at the intervillous space — trophoblast barrier, with evidence of barrier degradation (e.g., cell death and detachment) and apoptosis (see, FIG. 10). White arrows show barrier degradation, and dark arrows show apoptosis following trypan blue exposure.

Figure 11:
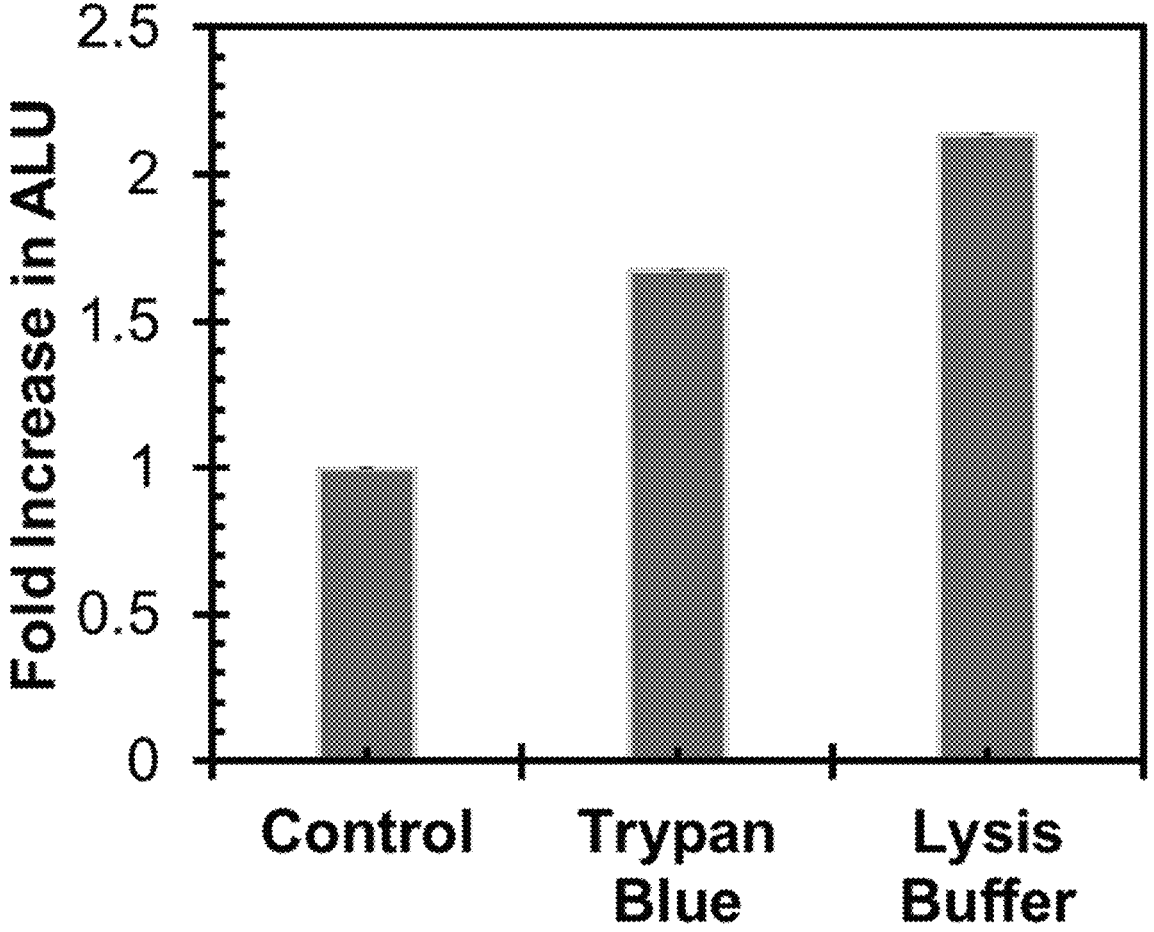
FIG. 11 includes a graph of data that shows the increase in ALU (arbitrary light unit) for luminescence for increase in adenylate kinase release.

Following exposure, FSS was injected into the maternal channel and permeability assayed. Permeability in the devices was 10-fold higher in trypan blue treated devices compared to controls. An additional assay was performed to determine cytotoxicity as it relates to the release of adenylate kinase. A positive control (100% death by lysis buffer) and a negative control (media only) were included for comparison. Samples were taken from the trophoblast channel and placed in a low volume, white walled 385-well plate for luminescence analysis using a plate reader. Trypan blue exposures resulted in a 1.5-fold increase in adenylate kinase release (see, FIG. 11). The increase in AK release in arbitrary luminescence units compares the toxic exposure of trypan blue to positive and negative controls.

Modeling and Simulation of Transplacental Transport

In some embodiments, the data that is obtained from the in vitro placenta device can be used for modeling and simulating an in vivo placenta in an in silico framework. As such, the data from the in vitro placenta device can be correlated with known in vivo placenta data for different substances and conditions. As such, the in vitro placenta device data can be used to model the in vivo data of a real placenta. The in vitro placenta device can then be used to simulate transplacental transport for various types of substances. The model can be tailored for the type of substances that are going to be used for test agents, such as by type, size, charge, and the like.

Some embodiments of the present invention include a computational model for analysis of fluid flow and species transport of test agents in the microfluidic in vitro placenta device platform. Computational model construction can begin with the generation of a 3D geometry of the microfluidic chambers and porous architecture of the in vitro placenta device followed by the generation of a computational mesh thereof. The mathematical equations used to characterize the computational modeling embodiment of the present invention are not intended to limit the invention to the mathematical equations used in the model description. Mathematical equations other than those proposed here can be expressed alone or in combination to arrive at the same mathematical results.

A system of partial differential equations (PDEs) can be used to model flow, diffusion, and reaction processes in the 3D system geometry. Time-dependent transport of multiple species (i.e. parent drug(s), metabolite(s), biomarkers, etc.) is characterized by the convective-diffusive-reactive transport equation, given by:

$$\frac{\partial C}{\partial t} + \nabla \cdot (vC) = \nabla \cdot D\nabla C + \dot{R}$$

where C is the concentration, t is time, v is the perfusion velocity, D is the compound-specific diffusion coefficient and $\dot{R}$ is the reaction source term. Fluid transport is determined by simultaneous solving of the Continuity and Momentum Equations as given by:

$$\text{Continuity Equation: } \frac{\partial}{\partial t}(\rho) + \nabla \cdot (\rho v) = 0$$

$$\text{Momentum Equation: } \frac{\partial}{\partial t}(\rho v) + \nabla \cdot (\rho vv) = -\nabla P + \nabla \cdot (\tau)$$

where $\rho$ is the fluid density, P is pressure and $\tau$ is the shear stress.

Volume conditions, such as density, viscosity and diffusivity, and boundary conditions, such as fluid velocity, pressure and species concentration, are specifically applied to characterize the system.

Figure 12:
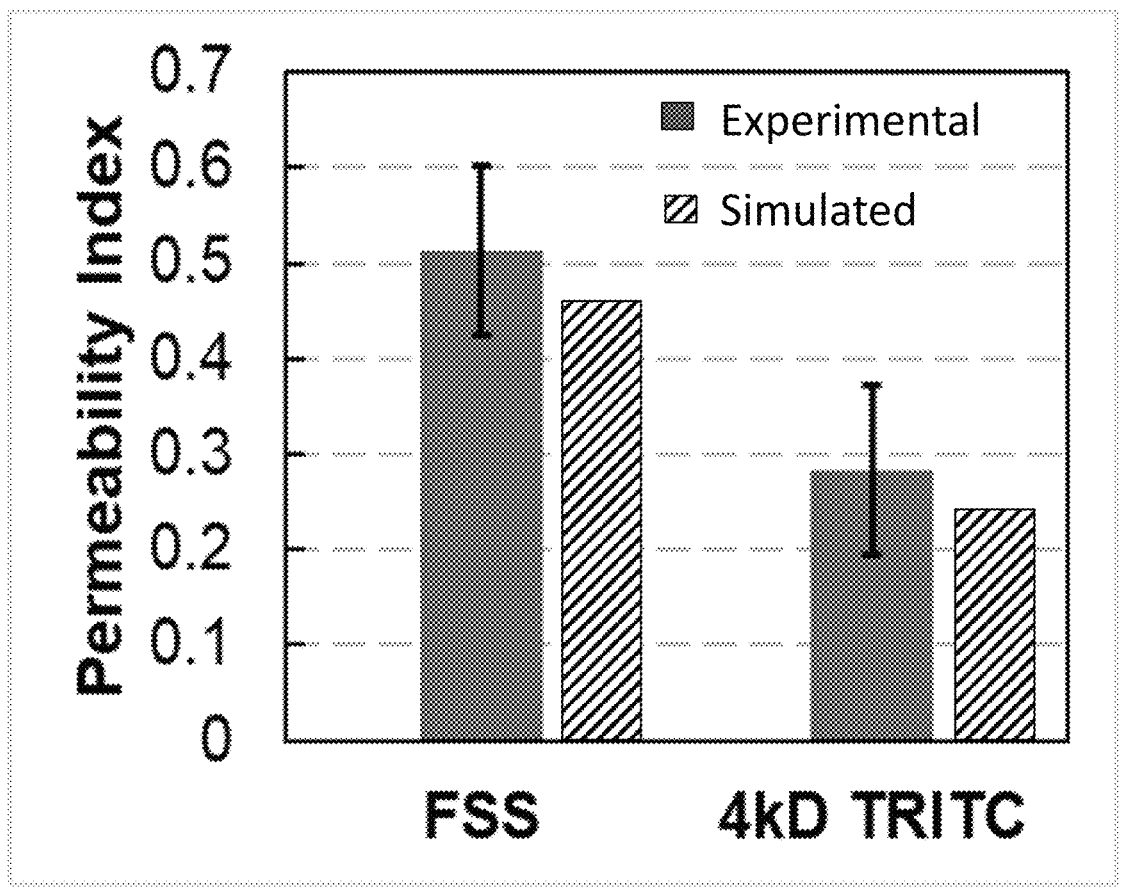
FIG. 12 includes a graph of data that shows the increase in permeability index for FSS and 4 kD TRITC in the experimental data obtained with the in vitro placenta device versus simulated data with an in silico placenta model.

For example, in one embodiment of the present invention, a 3D geometry of the microfluidic placental barrier model was created. In this implementation, the model was built using Computational Biology (CoBi) tools[9-15]. These tools enabled construction and meshing of the 3D geometry. A structured quadrilateral mesh was applied to the geometry and a grid independence test performed. A multiphysics solver (CoBi) was used to simultaneously solve the system of equations characterizing fluid flow and species transport. The following system operating parameters were applied as boundary conditions: i) fluid flow rates in the maternal and fetal channels set as constants at the inlets, ii) compound concentration set as a constant at the maternal inlet and iii) atmospheric pressure was set at all remaining inlets and outlets. Fluid properties of the media were assumed to be identical to those of water and assigned as constant volume conditions. These parameters include density and viscosity. Velocity, pressure and shear profiles were generated to verify physiologically relevant shear was achieved in the vascular channels. Species transport of FSS (fluorescein sodium salt) and 4 kD TRITC(tetramethylrhodamine)-dextran was simulated and PI calculated for comparison with in vitro data. Compound-specific diffusion coefficients were calibrated to fit the model to the data. Simulations were then repeated for cell-seeded devices, where the diffusion coefficient through the porous architecture was decreased ten-fold, similar to our approach in previous efforts[14]. Simulated PIs were compared with in vitro data are shown in FIG. 12. As shown, the simulated data is within the range of the experimental data. This allows for the model to be used to simulate different conditions in the placenta barrier, and can be used for simulating transplacental transport.

Figure 13:
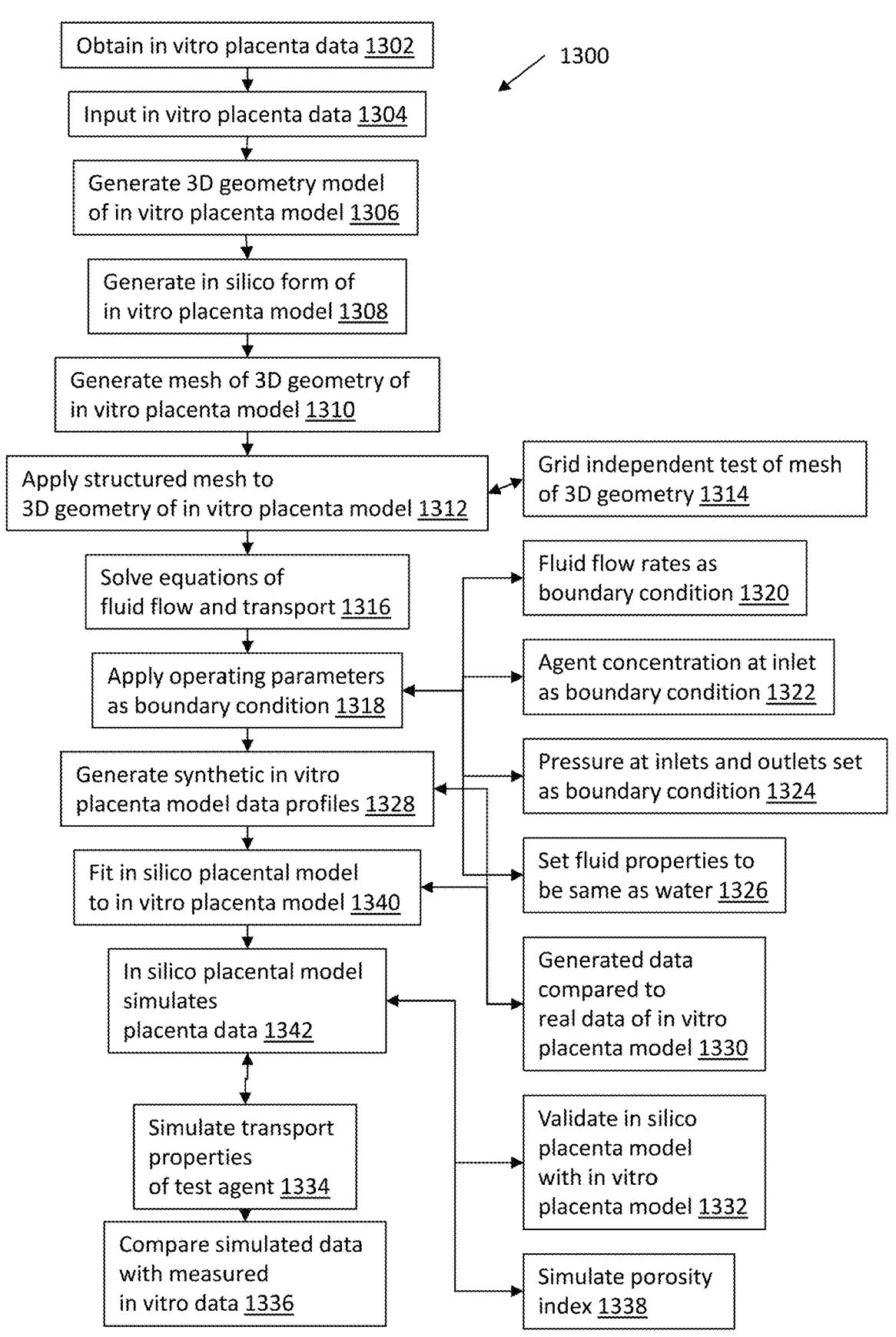
FIG. 13 shows a workflow 1300 for generating an in silico placenta model using data from the in vitro placenta device.

FIG. 13 shows a workflow 1300 for generating an in silico placenta model using data from the in vitro placenta device. The workflow 1300 includes obtaining in vitro placenta data from the in vitro placenta device (Step 1302) and inputting the in vitro placenta data into a computing system (Step 1304). The workflow 1300 also includes computationally generating a 3D geometry model of the in vitro placental model, and storing the 3D geometry model file on a non-transient storge medium of the computing system (Step 1306). The computational generation of the 3D geometry model of the in vitro placental model can be performed using computational biology tools to generate construction of an in silico placental model of the in vitro placental model (Step 1308) and generating mesh of the 3D geometry of the in vitro placental model (Step 1310). A structured quadrilateral mesh can be applied to the 3D geometry of the in vitro placental model (Step 1312). A grid independence test can be performed on the mesh of the 3D geometry (Step 1314). A computational solving module can be used to solve a system of equations that characterize fluid flow and species transport (Step 1316). The computational solving module can include applying operating parameters as boundary conditions for the computational analysis (Step 1318). The boundary conditions can include fluid flow rates in the maternal and fetal channels set as constants at the inlets (Step 1320). The boundary conditions can include the concentration of each compound or test agent can be set as constant at an inlet to the maternal circulation chamber of the in vitro placenta device (Step 1322). The boundary conditions can also include the atmospheric pressure being set at all other inlets and outlets of the in vitro placenta device (Step 1324). The computational solving module can set fluid properties to be identical as water and constant volume conditions (Step 1326). The computational solving module can generate in vitro placenta device data profiles, such as velocity, pressure, and shear profiles (Step 1328). The generated in vitro placental module data profiles are compared to the real in vitro placenta data (Step 1330), which is used to validate the physical in vitro placenta device and in silico placenta model (Step 1332). The transport properties of a test agent can then be simulated by the in silico placenta model (Step 1334), and these transport properties can be compared to the corresponding transport properties of the in vitro placenta module data physical in vitro placenta device (Step 1336). The in silico placenta model can be used to simulate porosity index values, which can be calculated (Step 1338), which can be compared to the porosity index values of the in vitro placenta device data (Step 1334 continued). Compound specific diffusion coefficients can be calibrated to fit the in silico placenta model to the real in vitro placenta device data (Step 1340) to obtain the fit in silico placenta model (e.g., PK model). The in silico placenta model can be used to perform simulations for the in vitro placenta device, which can be correlated with real placenta data. The in silico placenta can be used to simulate placenta data for one or more test agents (Step 1342).

Figure 14:
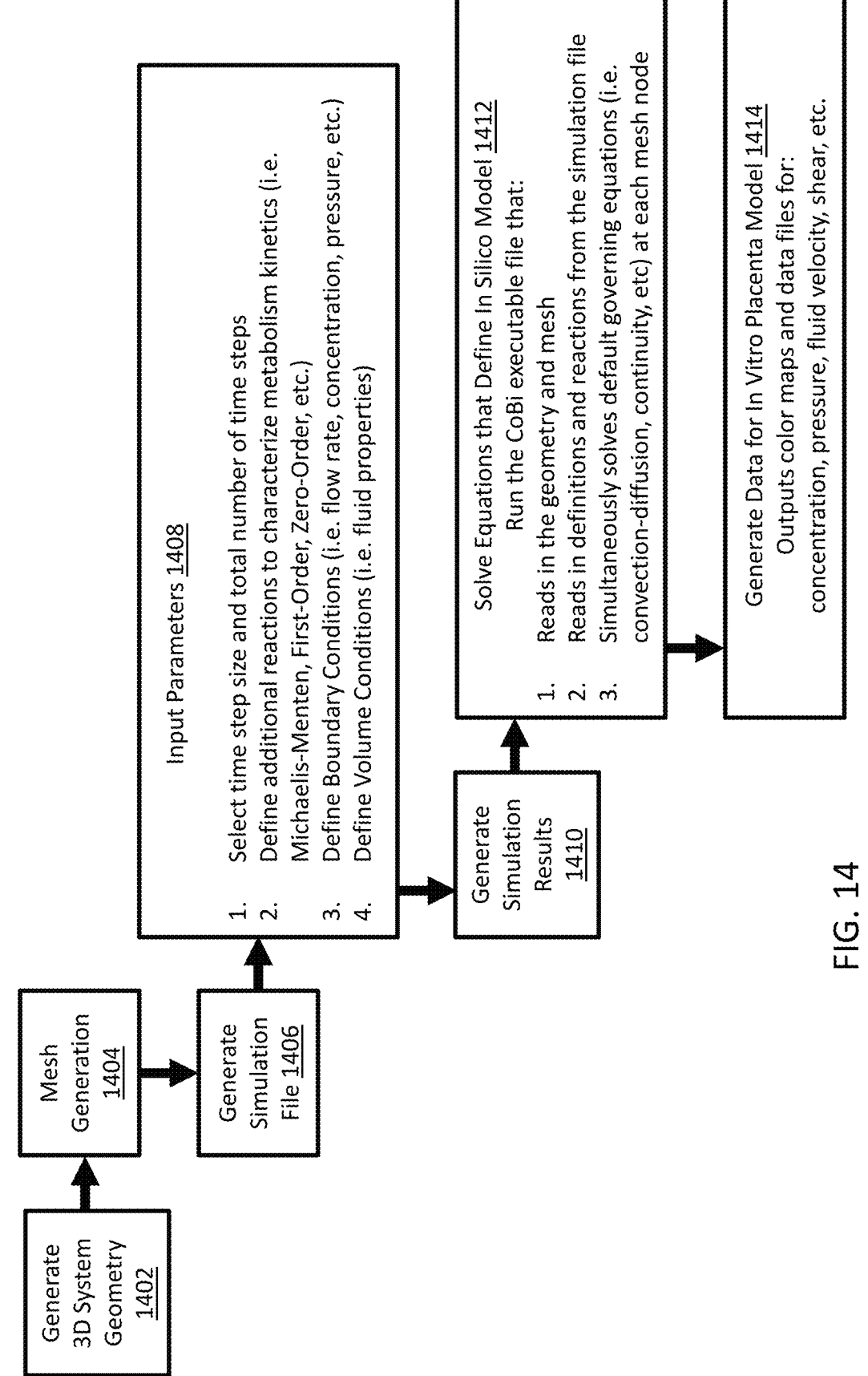
FIG. 14 illustrates a workflow 1400 for providing an in silico placenta model that models the in vitro placenta device.

FIG. 14 illustrates a workflow 1400 for providing an in silico placenta model that models the in vitro placenta device. The workflow 1400 generates a 3D system geometry (Step 1402). A mesh is generated for the 3D system geometry (Step 1402). A simulation file for the in silico model is generated for the mesh of the 3D system geometry (Step 1406). Input parameters are input into the system for use with the in silico model (Step 1408). The in silico model generates simulation results for the 3D system geometry (Step 1410). The system solve equations that define the in silico model (Step 1412). Simulation data is generated for the in vitro placenta device (Step 1414). The simulation data can be used to predict the real placenta of a human subject. This allows the in silico placenta model to be used to simulate a real placenta in a human subject. As such, test agents can be simulated in the in silico placenta model in order to obtain data of how the test agent would be taken by a real placenta.

The in silico placenta model can be used to simulate the placenta and assays on the placenta, such as transport of a test agent across the placental barrier. FIGS. 15A-15D provide examples of using the in silico placenta model to simulate placenta data.

Figure 15A:
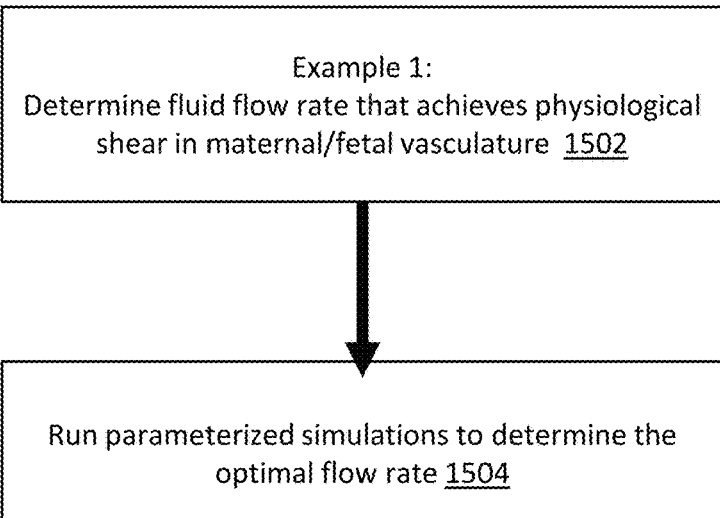
FIG. 15A shows Example 1, which includes determining fluid flow rate that achieves physiological shear in maternal/fetal vasculature (Step 1502), such as from the in vitro placenta device.

FIG. 15A shows Example 1, which includes determining fluid flow rate that achieves physiological shear in maternal/fetal vasculature (Step 1502), such as from the in vitro placenta device. Then, the in silico placenta model can be used to run parameterized simulations to determine the optimal flow rate in the in vitro placenta device (Step 1504). Then, the in vitro model device can be operated at the optimized flow rate to generate in vitro placenta data.

Figure 15B:
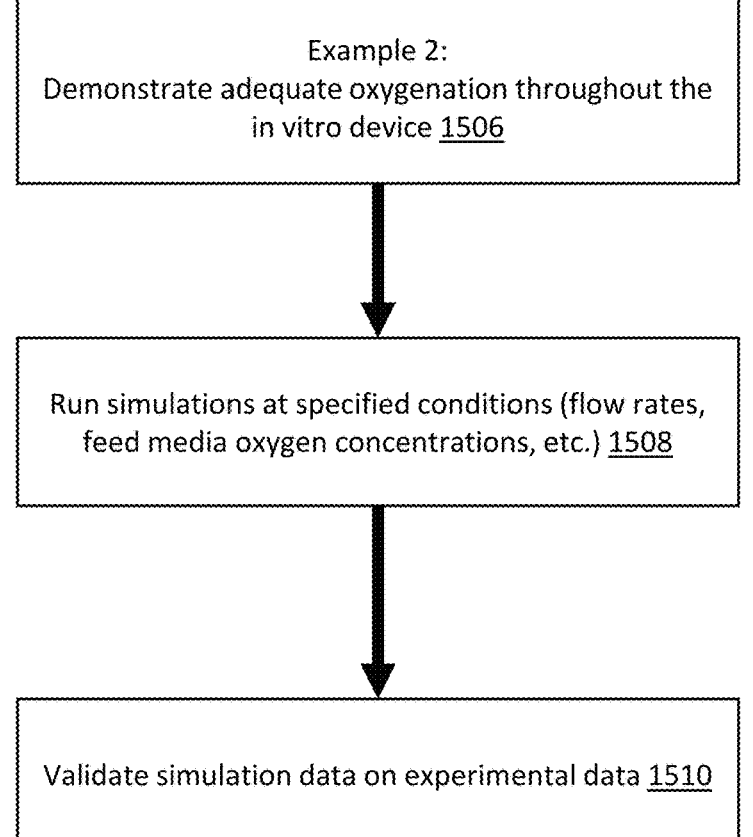
FIG. 15B shows Example 2, which demonstrates adequate oxygenation throughout the in vitro device (Step 1506).

FIG. 15B shows Example 2, which demonstrates adequate oxygenation throughout the in vitro device (Step 1506). The method includes running simulations at specified conditions (e.g., flow rates, test agent concentration, feed media oxygen concentrations, etc.) (Step 1508). Then, the simulation data obtained with the in silico placenta model can be validated with experimental data from the in vitro placenta device (Step 1510).

FIG. 15C shows Example 3, which includes determining the experimental dose of a test agent needed to achieve physiologically relevant or desired dosing in a target tissue, where the dose will go through the placental barrier (Step 1520). Then, a simulation can be run on the in silico placenta model to obtain simulation data (Step 1522), which can be one simulation that is run at some preliminarily estimated value. The in silico placenta model can be validated on a set of the experimental data from the in vitro placental model device (Step 1524). The validated in silico model can be used to simulate data for obtaining additional predictions of outcome for test agents and/or test conditions regarding the placental barrier (Step 1526).

Figure 15D:
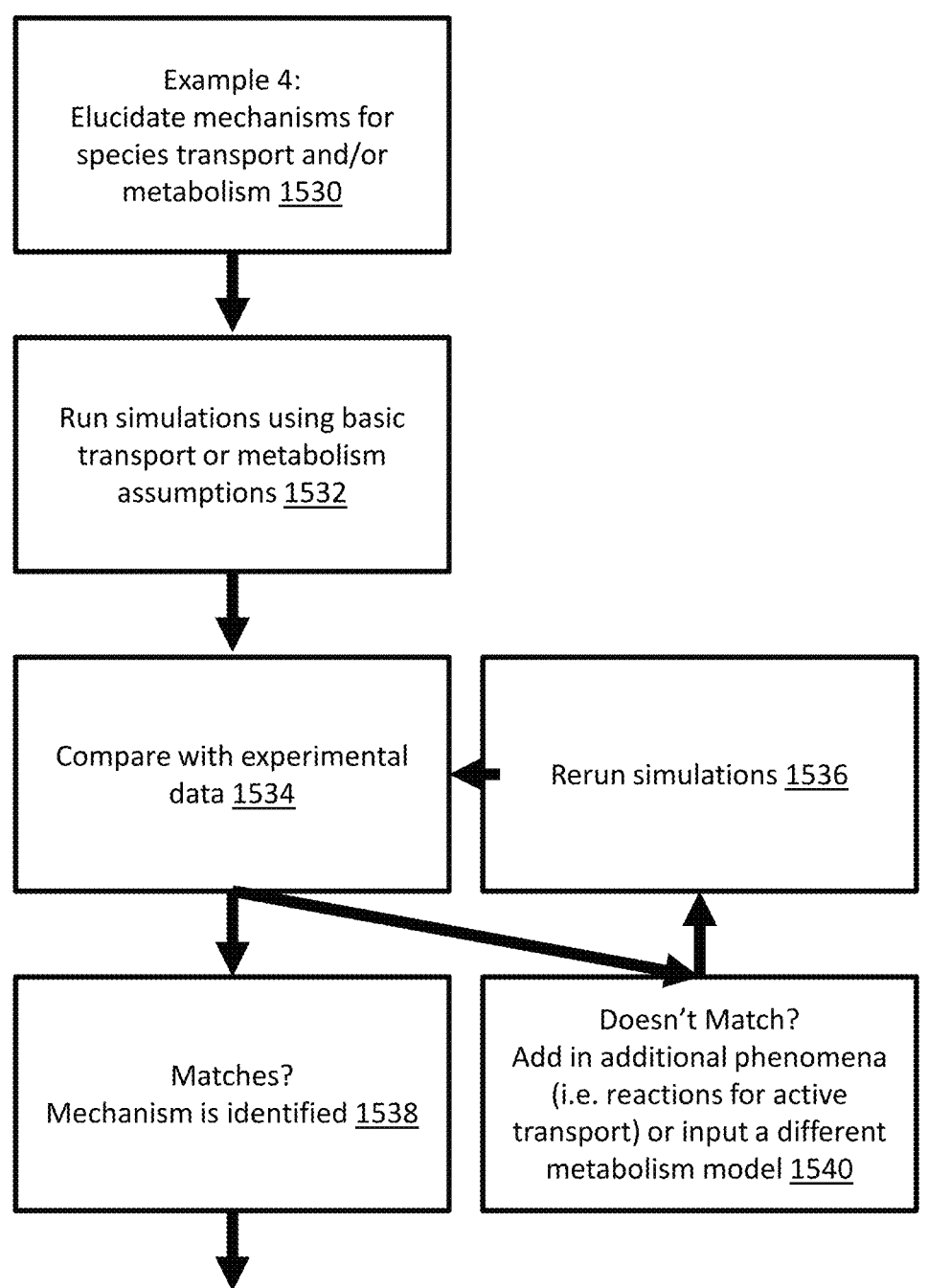
FIG. 15D shows Example 4, which includes a method for improving simulation data of the in silico placenta model.

FIG. 15D shows Example 4, which includes a method for improving simulation data of the in silico placenta model. The method can include elucidating mechanisms for species transport and or metabolism of a test agent with the in vitro placenta device (Step 1530). Then, a simulation can be performed using basic transport and/or metabolism assumptions regarding the test agent (Step 1532). The in vitro placenta device data (e.g., experimental data) is compared with the simulation data from the in silico placenta model (Step 1534). When the in vitro placenta device data matches the simulation data, the in silico model is determined to be suitable for modeling a real placenta (Step 1538). When the in vitro placenta device data does not match the simulation data (Step 1540), then the simulation parameters can be modulated and the simulation can be rerun (Step 1536). This iteration can be performed until a suitable in silico placenta model is obtain that can accurately model a test agent and/or test conditions in a placenta.

EXAMPLES

Example In Vitro Placenta Device Embodiments

In some embodiments, a microfluidic in vitro placenta device is provided for studying a placenta. Such an in vitro placenta device can include: a means of representing a maternal circulation system; a means of representing an intervillous space; a means of representing a placenta barrier; and a means of representing a fetal circulation system. The device can be configured as an in vitro microfluidic model of a placenta, and can be used to simulate the placenta to obtain data about the behavior of the placenta under certain conditions and in the optional presence of certain test agents. The maternal circulation system can be configured as a microvasculature structure that is configured to be coupled to a fluidic network with one or more pumps and optionally one or more media reservoirs. The intervillous space can be configured as a blood pool reservoir (e.g., model thereof), which may optionally be configured to be coupled to a fluidic network with one or more pumps and optionally one or more media reservoirs. The placenta barrier can be configured as a maternal-fetal interfacing region, which may optionally be configured to be coupled to a fluidic network with one or more pumps and optionally one or more media reservoirs. The fetal circulation system can be configured as a microvasculature structure that is configured to be coupled to a fluidic network with one or more pumps and optionally one or more media reservoirs.

In some embodiments, a microfluidic in vitro placenta device for studying a placenta can include: a maternal circulation chamber; an intervillous space chamber adjacent to and porously coupled with the maternal circulation chamber; a placental barrier chamber adjacent to and porously coupled with the intervillous space; a fetal circulation chamber adjacent to and porously coupled with the placental barrier chamber; wherein a first porous wall is positioned between the maternal circulation chamber and the intervillous space, a second porous wall is positioned between the intervillous space and the placental barrier chamber, and a third porous wall is positioned between the placental barrier chamber and the fetal circulation chamber, which is configured as a microfluidic in vitro model of a placenta.

In some embodiments, the in vitro placenta microfluidic device can include the following in the recited order: the maternal circulation system; a first porous wall; the inter-villous space; a second porous wall; the placenta barrier; a third porous wall; and the fetal circulation system.

In some embodiments, the in vitro placenta microfluidic device can include the following dimensions for the components. The components are recited in the sequential order of a fluid flow or a structural order from a beginning to a terminal end. The maternal circulation system can have a width of about 500 microns, or a range from about 200 microns to about 1000 microns, about 250 microns to about 900 microns, about 300 microns to about 800 microns, about 400 microns to about 600 microns. The first porous wall can have a width of about 50 microns, or a range from about 20 microns to about 100 microns, about 25 microns to about 90 microns, about 30 microns to about 85 microns, or about 40 microns to about 60 microns. The intervillous space chamber can have a width of about 100 microns, or a range from about 20 microns to about 200 microns, from about 40 microns to about 150 microns, about 60 microns to about 130 microns, or about 80 microns to about 120 microns. The second porous wall can have a width of about 50 microns, or a range from about 20 microns to about 100 microns, from about 35 microns to about 90 microns, from about 40 microns, to about 75 microns, or about 45 microns to about 60 microns. The placental tissue can have a width of about 2500 microns, or a range from about 50 microns to about 4000 microns, about 100 microns to about 3500 microns, about 500 microns to about 3000 microns, or about 1000 microns to about 2750 microns. The third porous wall can have a width of about 50 microns, or a range from about 20 microns to about 100 microns, from about 35 microns to about 90 microns, from about 40 microns, to about 75 microns, or about 45 microns to about 60 microns. The fetal circulation system can have a width of about 80 microns, or a range from about 50 microns to about 500 microns. The height of the device, or the height of any of the foregoing chambers or features can vary from about 10 microns to about 1000 microns, from about 50 microns to about 500 microns, or about 100 microns to about 200 microns, or about 150 microns. These values may be varied, such as +/−1%, 5%, 10%, 25%, 50%, 75%, or 100% thereof.

In some embodiments, the in vitro placenta microfluidic device can be configured with the following dimensions of the components, which are recited in an order or arrangement from a beginning to a terminal end. The maternal circulation system can have a length of about 14 mm, or a range from about 10 mm to about 25 mm, from about 13 mm to about 21 mm, or about 15 mm to about 20 mm. The first porous wall can have a length of about 5200 microns, or a range from about 1000 microns to about 10000 microns, about 2000 microns to 8000 microns, or about 4000 microns to about 6000 microns. The intervillous space can have a length of about 14 mm, or a range from about 10 mm to about 25 mm, about 13 mm to about 21 mm, or about 15 mm to about 20 mm. The second porous wall can have a length of about 5200 microns, or a range from 1000 microns to about 10000 microns, about 2000 microns to 8000 microns, or about 4000 microns to about 6000 microns. The placenta barrier can have a length of about 14 mm, or a range from about 10 mm to about 25 mm, about 13 mm to about 21 mm, or about 15 mm to about 20 mm. The third porous wall can have a length of about 5200 microns, or a range from about 1000 microns to about 10000 microns about 2000 microns to 8000 microns, or about 4000 microns to about 6000 microns. The fetal circulation system can have a length of about 14 mm, or a range from about 10 mm to about 25 mm, about 13 mm to about 21 mm, or about 15 mm to about 20 mm. In some aspects, these values can be modified, such as by +/−1%, 5%, 10%, 25%, 50%, 75%, or 100% thereof.

In some embodiments, each porous wall can include pore channels therethrough that are 5 microns wide that are spaced 50 microns apart. The width of each pore channel may range from about 1 micron to about 10 microns, about 2 microns to about 8 microns, or about 3 microns to about 7 microns. The heights of each pore channel can ranges from about 6 microns to about 10 micron, or about 8 microns. The spacing of the channels can be from about 5 microns to about 100 microns, about 10 microns to about 90 microns, or about 25 microns to about 75 microns. These values may be modified, such as by +/−1%, 5%, 10%, 25%, 50%, 75%, or 100% thereof. In some aspects, the device can include a porous wall between the intervillous space and the placenta barrier. In some aspects, the device can include a porous wall between the placenta barrier and the fetal circulation system.

In some embodiments, the placenta barrier chamber includes a plurality of support posts. The support posts can be dimensioned and arranged so as to be configured to stop collapse under physiological fluidic flow and pressure. The support posts can be used to maintain mechanical stability of the in vitro device. The device can also include a lid, wherein the lid is supported by the support posts.

In some embodiments, the different chambers or regions in the in vitro placenta device can include different types of cells. Accordingly, the chambers can include the following cell types for defining the operation of the chamber. The placenta barrier can include placenta barrier cells, which can be trophoblast cells. The maternal cells can include maternal endothelium cells, and the fetal cells can include fetal endothelium cells. The combination of the maternal circulation system, intervillous space, placenta barrier, and fetal circulation system mimic three dimensional architecture of a physiological placental membrane. The maternal circulation system can include maternal vascular endothelial cells. The intervillous space can include maternal endothelial cells or is devoid of cells. The placental membrane includes trophoblast cells (e.g., cytotrophoblasts (CTB) and/or syn-cytiotrophoblasts (STB)). In some aspects, the placenta barrier includes trophoblast cells (e.g., cytotrophoblasts (CTB) and/or syncytiotrophoblasts (STB)) and endothelial cells in a co-culture or tri-culture. The fetal circulation system can include fetal endothelial cells.

In some embodiments, the in vitro placenta device can include a viewing window into at least one of the maternal circulation system, intervillous space, placenta barrier, or fetal circulation system. However, each of these systems or chambers can be configured for optical viewing. These systems or chambers can have a clear lid or top, or any other surface, to allow for optical viewing of the content thereof. This can allow for labeling and other colorimetric techniques for monitoring the cultures as well as flow of components and test agents throughout the system.

In some embodiments, an assay chip can be configured with the in vitro placenta device. The assay chip can include a substrate; and a plurality of the microfluidic in vitro placenta devices in or on the substrate. The plurality of microfluidic in vitro models can be in parallel or sequential, or combinations thereof.

In some embodiments, a microfluidic in vitro placenta system can include: the microfluidic in vitro placenta device of one of the embodiments; and at least one pump configured for pumping fluid through the microfluidic in vitro placenta device.

In some embodiments, a microfluidic in vitro placenta system can include: the microfluidic in vitro placenta device of one of the embodiments; at least one camera device configured to be positioned to image at least one of the maternal circulation chamber, intervillous space chamber, placental barrier chamber, or fetal circulation chamber; and a computing system operably coupled with the at least one camera device to receive image data. In some aspects, the computing system is configured to obtain data from the at least one camera device and determine at least one trans-placenta transport barrier property of the microfluidic in vitro placenta device or at least one trans-placenta transport property of a test agent, wherein the trans-placenta transport barrier property is a measurement of inhibition of transport of an agent across the placental barrier chamber and the trans-placenta transport property of a test agent is a measurement of traversal of the test agent across the placental barrier chamber. In some aspects, the computing system includes one or more computer-readable media storing instructions that when executed cause operations that determine the at least one trans-placenta transport barrier property of the microfluidic in vitro placenta device or the at least one trans-placenta transport property of a test agent.

In some embodiments, the in vitro placenta device can be used in a method of studying the placenta. The method can include providing the in vitro placenta device of one of the embodiments. For example, the device includes maternal endothelial cells in the maternal circulation system, placental cells in the placenta barrier, and fetal endothelial cells in the fetal circulation system. The device can be used for determining a condition of the in vitro placenta device at a first time point. The condition can be any physiological condition of the cells, fluid flow, test analyte, or other feature. Then, the method can include determining the condition of the in vitro placenta device at a subsequent time point. That is, the same feature can be measured at a later time, such as after exposure to a certain condition or test analyte. Then, a computing system can be used for determining a change in the condition of the in vitro placenta device.

In some embodiments, the method of studying the placenta can include: measuring a barrier function property of the placental barrier chamber; imaging the maternal circulation chamber, intervillous space chamber, placenta barrier chamber, or fetal circulation chamber through a viewing window of the device; viewing images in real time of the maternal circulation chamber, intervillous space chamber, placenta barrier chamber, or fetal circulation chamber through a display screen of a computing system; or measuring transport across the placental barrier chamber of at least one of nutrients, xenobiotics, small molecules, lipids, liposomes, polymers, particles, toxins, and antibodies from the images.

In some embodiments, the method of studying the placenta can include: providing the microfluidic in vitro placenta device of one of the embodiments having maternal endothelial cells in the maternal circulation chamber, placental cells in the placental barrier chamber, and fetal endothelial cells in the fetal circulation chamber; providing a test agent to an input chamber selected from the maternal circulation chamber, intervillous space chamber, or fetal circulation chamber; and monitoring trans-placental transport of the test agent across the placental barrier chamber.

In some embodiments, a method of studying transport of the test agents can include at least one of: determining an amount of test agent crossing the placental barrier chamber and comparing the amount of test agent that crossed the placental barrier chamber with the administered amount of the test agent introduced into the microfluidic in vitro placenta device; sampling the fetal circulation chamber for the test agent and quantifying the transport of the test agent across the placental barrier chamber into the fetal circulation chamber; or sampling the maternal circulation chamber for the test agent and quantifying the transport of the test agent across the placental barrier chamber into the maternal circulation chamber.

In some embodiments, the methods can include evaluating placental barrier function of the placental barrier chamber by: injecting a plurality of different test agents having a plurality of different sizes into the maternal circulation chamber; imaging the in vitro placenta device; analyzing images of the in vitro placenta device to identify the plurality of different test agents; and determining a size of test agent or size range of test agent of the plurality of test agents located in the maternal circulation chamber, intervillous space chamber, placental barrier chamber, and/or fetal circulation chamber.

In some embodiments, the methods can include determining at least one of: a size of test agent or size range of test agents capable of transporting from the maternal circulation chamber across the placental barrier chamber into the fetal circulation chamber; a lipophilicity of test agent or lipophilicity range of test agents capable of transporting from the maternal circulation chamber across the placental barrier chamber into the fetal circulation chamber; or a physiological charge of test agent or charge range capable of transporting the maternal circulation chamber across the placental barrier chamber into the fetal circulation chamber.

In some embodiments, the methods can include evaluating permeability of the in vitro placenta device by: injecting one or more test agents into the maternal circulation chamber; imaging the microfluidic in vitro placenta device; analyzing images of the microfluidic in vitro placenta device to identify locations of the test agent at defined time points, and optionally determine amounts of each test agent in each chamber at the time points; and determining a permeability of the in vitro placenta device for the one or more test agents.

In some embodiments, the methods can include determining a permeability index as a ratio of optical intensity measurements of the maternal circulation chamber with the fetal circulation chamber.

In some embodiments, the methods can include evaluating whether the test agent modifies permeability or structural integrity or morphology of the placental barrier chamber by: determining an initial value of a first property of the placental barrier chamber; introducing the test agent into the microfluidic in vitro placenta device; determining a subsequent value of the first property of the placental barrier chamber; and determining a difference between the initial value and the subsequent value of the first property of the placental barrier chamber. The value can be related to one or more of structural integrity or morphology of the placental barrier chamber or other feature, as well as features of the test agent.

In some embodiments, the methods can include determining a health consequence of the test agent modulating the placental barrier chamber by correlating the difference between the initial value and the subsequent value and a phenotypic state, which phenotypic state may or may not be a disease state or disorder state.

In some embodiments, the in vitro placenta device can include the maternal circulation system and/or intervillous space being configured to model maternal blood. Additionally, the in vitro placenta device can include the fetal circulation system being configured to model umbilical cord blood or fetal capillary blood.

In some embodiments, the method of studying the placenta can include obtaining in vitro transport data, and converting the in vitro transport data into synthetic in vivo transport data with a computational placenta model. Here, the system can use the actual data from the in vitro device, such as over a number of runs, and then create synthetic in vivo transport data therefrom. The conversion can use a computational model that correlates the in vitro data to in vivo transport data.

In some embodiments, the method of studying the placenta can include measuring a barrier function property of the placental barrier. Here, at least one test analyte can be used with the device to test the transport of the test analyte across the placental barrier. Then, the data thereof can be used for determining a barrier function property based on the measured data.

In some embodiments, the method of studying the placenta can include optically viewing, such as with human eyes, camera, video or other recorder the different components of the device. As such, the following components can be configured for visual monitoring, and may include camera devices to record the maternal circulation system, intervillous space, placenta barrier, or fetal circulation system through a viewing window of the device.

In some embodiments, the method of studying the placenta can include performing in real-time, quantitative imaging of: EC-trophoblast interactions; the trophoblast response to endothelial-mediated drug exposure; and biological secretions. This monitoring can be done with a camera system and visualization of the contents of each component. Also, dyes and other markers can be used to track different features of the trophoblast activity and biological secretions.

The method of studying the placenta can include validating the in vitro placenta device on maternal to fetal transport of selected nutrients, xenobiotics, lipids, toxins and antibodies. Here, the data obtained from the in vitro model can be compared to known in vivo data for these types of test analytes. As such, these test analytes may be used as controls in the different assays.

In some embodiments, the method of studying the placenta can include performing assays for one of the following on any of the compartments or components of the in vitro device, such as viability, syncytialization (e.g., the formation of syncytiotrophoblasts from cytotrophoblasts, cytotrophoblasts or osteoblasts), and phenotypic expression assays. The data from these assays can be used to optimize and characterize the in vitro model.

In some embodiments, the in vitro placenta device can be used in a method of studying transport of test agents across the placenta. The in vitro model can be used to simulate the in vivo placenta. The method can include providing the in vitro placenta device of one of the embodiments and providing a test agent to the maternal circulation system or intervillous space. Then, various techniques can be used for monitoring the test agent in the fetal circulation system. The amount of test agent from the maternal system or intervillous space provides information for the transport of that test agent to then travel into the fetal circulation system, which simulates the in vivo transport.

In some embodiments, the method of studying transport of test agents can be performed to include determining an amount of test agent crossing the placenta barrier into the fetal circulation system. The amount of the test agent that crosses the membrane can be determined from the amount that makes it into the fetal circulation system. The data can be analyzed by comparing the amount of test agent in the fetal circulation system with the administered amount of the test agent introduced into the maternal circulation system or intervillous space. The amount that passes through the model is indicative of the function of the placenta and ability of the test agent to also transport through the placenta. In some aspects, the method of studying transport of test agents can include sampling the fetal circulation system for the test agent, and quantifying the transport of the test agent into the fetal circulation system. The configuration of the in vitro placenta device with optical viewing windows allows for performing a real-time study of cellular behavior, drug delivery and efficacy with the in vitro placenta device.

The different components of the in vitro placenta device can be evaluated. The method of studying transport of test agents can include determining a maternal endothelium contribution to transport resistance in the in vitro placenta device. Additionally or alternatively, the method can include evaluating barrier function of the in vitro placenta device. For example, the protocol for evaluating barrier function of the in vitro placenta device can be performed by: injecting a plurality of different test agents having a plurality of different sizes into the maternal circulation system; imaging the in vitro placenta device; analyzing images of the in vitro placenta device to identify the test agent; and determining a size of test agent or size range of test agent located in the maternal circulation system, intervillous space, placenta barrier, and/or fetal circulation system. Different sizes can include different coloring or other markers; however, the size of the test agents can be monitored by the known size and optical tracking of the particles through the flow path of the in vitro placenta device. Also, the protocol can include determining a size of test agent or size range of test agent capable of transporting from the maternal circulation system to the fetal circulation system.

In some embodiments, the method of studying transport of test agents can include determining a lipophilicity of test agent or lipophilicity range of test agent capable of transporting from the maternal circulation system to the fetal circulation system. As such, a panel of different agents with a gradient of lipophilicity can be used and monitored in order to create a lipophilicity profile for test agents, which can provide a lipophilicity range of the in vitro device. The amount of lipophilicity of a certain substance type can be assessed to determine whether such lipophilicity modulates the transport thereof or other test agents in the in vitro placenta device.

In some embodiments, the method of studying transport of test agents can include determining a physiological charge of test agent or range thereof capable of transporting from the maternal circulation system to the fetal circulation system. Accordingly, the different charges of different test agents can be monitored across a panel for transport in the in vitro placenta device. The pH may also be varied to monitor the modulation that charges can have on the transport phenomena.

In some embodiments, the method of studying transport of test agents can include evaluating permeability of the in vitro placenta device. The permeability may compromise the transport data that can be determined to make sure the data is physiologically relevant to in vivo placenta parameters. The permeability can be assessed by: injecting test agent into the maternal circulation system; imaging the in vitro placenta device; analyzing images of the in vitro placenta device to identify locations of the test agent and optionally determine amounts of test agent in each location; and determining a permeability of the in vitro placenta device for the test agent. The test agent may or may not be labeled with a visible label, such as fluorescent label. The method can also include evaluating permeability of the in vitro placenta device by: injecting test agent into the maternal circulation system; imaging the fetal circulation system; analyzing images of the fetal circulation system to identify the test agent; and determining a permeability of the in vitro placenta device for the test agent. The evaluation of permeability of the in vitro placenta device can also be performed by: injecting test agent into the maternal circulation system; imaging the maternal circulation system; analyzing images of the maternal circulation system to identify the test agent; and determining a permeability of the in vitro placenta device for the test agent. Also, the permeability of the in vitro placenta device can be evaluated by: injecting test agent into the maternal circulation system; imaging the intervillous space; analyzing images of the intervillous space to identify the test agent; and determining a permeability of the in vitro placenta device for the test agent. In another aspects, the protocol for evaluating permeability of the in vitro placenta device can be performed by: injecting test agent into the maternal circulation system; imaging the placenta barrier; analyzing images of the placenta barrier to identify the test agent; and determining a permeability of the in vitro placenta device for the test agent. These studies may be used alone or in any combination for monitoring the permeability.

In some embodiments, the method of studying transport of test agents can include determining a permeability index. The permeability index can be defined as a ratio of a sum of optical intensity measurements of one or more region of interests (ROIs) in the trophoblasts of the placenta barrier and vascular channels of the maternal and fetal circulation systems. This ratio between the optical intensity measurements of the material and fetal circulation systems can be used to define the permeability. Accordingly, the method can include: determining a permeability index for the maternal circulation system relative to the placenta barrier; determining a permeability index for the fetal circulation system relative to the placenta barrier; and determining a difference in permeability index for the maternal circulation system compared to the fetal circulation system.

In some embodiments, the methods can also include evaluating whether an agent modifies permeability of the in vitro model, or the maternal circulation system, intervillous space, placenta barrier, and/or fetal circulation system. As such, a test agent can be used with other test substances (e.g., positive or negative controls) to see if there is a modification of the permeability of the test substance. These types of agents may be used in treatments to either increase or decrease the permeability of the placenta. For example, the protocol can include evaluating whether a test agent modulates structural integrity of the placenta barrier by: determining an initial value of a first property of the placenta barrier; introducing the test agent into the in vitro microfluidic model; determining a subsequent value of the first property of the placenta barrier; and determining a difference between the initial value and the subsequent value. The protocols can also include determining a health consequence of the test agent modulating structural integrity by correlating the difference between the initial value and the subsequent value and a phenotypic state, which may or may not be a disease state or disorder state. An example of monitoring structural changes can include determining a morphological change to the placenta barrier after treatment with the test agent.

Example In Silico Placenta Model Embodiments

In some embodiments, a method of computationally modeling a placenta can include: generating a 3D geometry computer model of an in vitro placenta device; generating a mesh of the 3D geometry computer model; generating a computer model of the in vitro placenta device with the mesh; and processing the computer model through an solver module to obtain an in silico placenta model.

In some embodiments, a method of computationally modeling a placenta can be performed. The computationally modeled placenta can be used for simulating an in silico placenta to generate data to represent an in vivo placenta. The computationally modeled placenta can be obtained by obtaining data from the in vitro placenta device of one of the embodiments, wherein the in vitro model device is a physical model of a placenta. Then, the computing system can be used for creating an in silico computational model of the in vitro model device. Then, the computing system can generate a physiology-based pharmacokinetic (PBPK) model of the placenta. The computationally modeled placenta can be used for predicting transport efficiency of the physical in vitro placenta device. Accordingly, certain test agents can be used for the in vitro model to obtain a corresponding in silico model of the placenta. For example, the computationally modeled placenta can be created by obtaining in vitro transport data, and converting the in vitro transport data into synthetic in vivo transport data with the placental PBPK model.

The in silico placenta can be obtained as described and used in a number of different types of studies for the placenta. In one example, the in silico placenta model can be used for determining how some properties (e.g., one or more of protein binding, ionization, lipophilicity and molecular weight) impact transplacental transport. Accordingly, relevant data of the test agent can be obtained, such as the foregoing, and the data can be input into the computing system.

In some embodiments, the in silico placental model can be used for computationally modeling the placenta by corelating fetal exposure to the test compound and toxicity to the fetus.

In some embodiments, the computationally modeled placenta can be used for modeling a maternal endothelium contribution to transport resistance.

In some embodiments, the computationally modeled placenta can be used for evaluating mechanisms of transplacental transport.

In some embodiments, the computationally modeled placenta can be used for performing a sensitivity analysis to predict which factors are likely to be rate limiting for transfer and to identify factors that lead to placental dysfunction and increased fetal toxicity.

In some embodiments, the computationally modeled placenta can be configured as a maternal-fetal physiology-based pharmacokinetic (PBPK) model with a high-resolution three dimensional model of the placenta.

In some embodiments, the computationally modeled placenta can be configured as the maternal-fetal PBPK model for a placental transport model based on the complex structure and physiology of the placenta.

In some embodiments, the computationally modeled placenta can be configured as a maternal-fetal PBPK model that can be used for mechanistic modeling of transplacental transport, paracellular, transcellular, transporter mediated, and metabolism mechanisms.

In some embodiments, the computationally modeled placenta can be configured as the maternal-fetal PBPK model, which is extrapolated from the in silico placenta model that is based on the in vitro placenta device.

In some embodiments, the method of computationally modeling the placenta can include importing data into a multi-physics solver module, which: simultaneously solves a system of equations of fluid flow and species transport. In some aspects, the in silico placenta model is dimensioned as the in vitro microfluidic placenta model. To have variability in placenta size, the in silico placenta model or maternal-fetal PBPK model is operable across a range of mesh sizes.

In some embodiments, the method of computationally modeling the placenta can include boundary conditions. For example, the in silico placenta model includes boundary conditions as follows: i) fluid flow rates in the maternal and fetal channels set as constants at the inlets, ii) fluorescent compound concentration set as a constant at the maternal inlet, and iii) atmospheric pressure was set at all remaining inlets and outlets. The operation can include the fluid properties of the media being assumed to be identical to water and assigned as constant volume conditions, wherein the fluid properties optionally include density and viscosity.

In some embodiments, a method of computationally modeling the placenta can include: simulating the in vitro placenta device with the in silico placenta model; comparing simulation data of the simulation with real data from the in vitro placenta device; and iterating the simulation until simulation data matches the real data.

In some embodiments, a method of computationally modeling the placenta can include calibrating diffusion coefficients for one or more test agent to fit the simulation data of the in silico placenta model or the maternal-fetal PBPK model with the real data of the in vitro placenta device.

In some embodiments, a method of computationally modeling the placenta can include using a machine learning platform having a deep neural network for optimizing the in silico placenta model to simulate the in vitro placenta device. Some aspects can include using a machine learning platform having a deep neural network for optimizing the in silico placenta model or maternal-fetal PBPK model with data from the in vitro placenta device or real placental data to simulate an in vivo placenta.

In some embodiments, the method of computationally modeling the placenta can include configuring the in silico placenta model or maternal-fetal PBPK model for analyzing flow-induced shear and species transport.

In some embodiments, a method of computationally modeling the placenta can include using simulation data from the in silico placenta model for obtaining the maternal-fetal PBPK model.

In some embodiments, a method of computationally modeling the placenta can be used for obtaining maternal-fetal PBPK model predictions for time-dependent concentrations of molecules in fetal circulation are compared with experimental data from the in vitro placenta device and from real data (e.g., literature).

In some embodiments, a method of computationally modeling the placenta includes the in silico placenta model considering convective-diffusive transport in calculations and determinations of transport properties and value of various types of test agents. In some aspects, the in silico placenta model considers convective-diffusive transport, transporter mediated transport, metabolism, and combinations thereof.

In some embodiments, a method of computationally modeling the placenta includes a maternal-fetal PBPK model being configured for obtaining data regarding specific transporters, metabolizing enzymes, and other parameters.

In some embodiments, a method of computationally modeling the placenta includes the maternal-fetal PBPK model being configured for predicting factors that are rate limiting steps for transfer of an agent across a placental tissue.

In some embodiments, a method of computationally modeling the placenta can include the maternal-fetal PBPK model being configured for modeling passive placental diffusion by Fick's law.

In some embodiments, a method of computationally modeling the placenta can include the maternal-fetal PBPK model being configured for modeling the placenta with distribution differences related to partitioning (e.g., based on LogP), size exclusion (e.g., MW) and exclusion of ionized compounds.

In some embodiments, a hybrid placenta model system can include a physical in vitro placenta device of one of the embodiments, and an in silico placenta model of one of the embodiments, which is generated based on data of the in vitro placenta device. In some embodiments, a computational placenta model correlates in vitro data from the physical placenta model with in vivo data, and provides synthetic in vivo data for a model placenta.

In some embodiments, a maternal-fetal PBPK model is prepared from the in silico placenta model with in vivo data. The in vivo data can be obtained from experiment, literature, or other. The in vivo data is used with the in silico placenta model to create the maternal-fetal PBPK model.

In some embodiments, a method of simulating a placenta can include: providing the maternal-fetal PBPK model; simulating a condition in a placenta with the maternal-fetal PBPK model; and determining an outcome of the condition in a real placenta based on the outcome of the maternal-fetal PBPK model. The condition can be any type of physical condition, or compositional condition. Different test agents can also be used as test agent condition, which can be used for screening. In some aspects, the condition is a test agent, and the outcome is transport of the test agent across the placenta into a fetus.

In some embodiments, a method of computationally modeling a placenta can include: generating a 3D geometry computer model of an in vitro placenta device; generating a mesh of the 3D geometry computer model; generating a computer model of the in vitro placenta device with the mesh; and processing the computer model through an solver module to obtain an in silico placenta model.

In some embodiments, a method of computationally modeling a placenta can include: obtaining data from an in vitro placenta device, wherein the in vitro placenta device is a physical model of a placenta; creating a computational model of the in vitro model device; and generating a physiology-based pharmacokinetic (PBPK) model of the placenta as the in silico placenta model.

The method of computationally modeling a placenta can include: applying a structured quadrilateral mesh to the 3D geometry computer model; performing a grid independence test; and determining the mesh for the 3D geometry computer model to be valid for the in vitro placenta device.

In some embodiments, a method of computationally modeling a placenta can include solving equations of fluid flow and transport (e.g., operational conditions) of the 3D geometry computer model. Operational conditions that can be in equations can govern physics and other phenomena that occur within or upon the in vitro placenta device. Also, volume and boundary conditions that characterize the materials and conditions inside or at the boundary of the in vitro placenta device.

In some embodiments, a method of computationally modeling a placenta can include setting operating parameters of the in silico placenta model, which operating parameters are applied as boundary conditions.

In some embodiments, the method of computationally modeling a placenta can include an in vitro placenta device that comprises: a maternal circulation chamber; an intervillous space chamber adjacent to and porously coupled with the maternal circulation chamber; a placental barrier chamber adjacent to and porously coupled with the intervillous space; a fetal circulation chamber adjacent to and porously coupled with the placental barrier chamber; wherein: a first porous wall is positioned between the maternal circulation chamber and the intervillous space, a second porous wall is positioned between the intervillous space and the placental barrier chamber, and a third porous wall is positioned between the placental barrier chamber and the fetal circulation chamber, the maternal circulation chamber includes maternal endothelial cells; the intervillous space chamber includes maternal endothelial cells or is devoid of cells; the placental barrier space includes placental cells; and the fetal circulation chamber includes fetal endothelial cells; which is configured as a microfluidic in vitro model of a placenta.

In some embodiments, a method of computationally modeling a placenta can include the operating parameters as follows: setting fluid flow rates in the maternal circulation chamber; setting fluid flow rates in the fetal circulation chamber; setting a test agent concentration as a constant at an inlet of the maternal circulation chamber; and setting atmospheric pressure at all remaining inlet and outlets of the in vitro placenta device.

In some embodiments, the method of computationally modelling a placenta can include setting fluid properties to be identical with water as constant volume conditions.

In some embodiments, a method of computationally modelling a placenta can include at least one of: generating velocity, pressure, and/or shear profiles for one or more flow rates in the in vitro placenta device; generating velocity, pressure, and/or shear profiles with the in silico placenta model; and validating whether or not physiological relevant sheer is achieved in the in vitro placenta device and/or the in silico placenta model.

In some embodiments, a method of computationally modelling a placenta can include at least one of: generating a porosity index of one or more test agents for one or more flow rates in the in vitro placenta device; generating a porosity index of the one or more test agents with the in silico placenta model; and validating the porosity index of the one or more test agents with the in vitro placenta device and/or the in silico placenta model.

In some embodiments, a method of computationally modeling a placenta can include fitting the in silico placenta model with in vitro placenta device data.

In some embodiments, a method of computationally modeling a placenta can include: inputting input parameters for one or more conditions and/or one or more test agents into the in silico placenta model; and generating simulated placenta data for the one or more conditions and/or one or more test agents.

In some embodiments, a method of computationally modeling a placenta can include generating a simulation file by: selecting time step size and total number of time steps; defining additional reactions to characterize metabolism kinetics; and defining boundary conditions; and defining volume conditions.

In some embodiments, a method of computationally modeling a placenta can include generating simulation results of the in silico placenta model.

In some embodiments, a method of computationally modeling a placenta can include solving equations that define the in silico placenta model by: reading geometry and mesh data; reading definitions and reactions from the simulation file; and simultaneously solving the equations at east mesh node.

In some embodiments, a method of computationally modeling a placenta can include: generating data for in vitro placenta device; and outputting data files for concentration, pressure, fluid velocity, and shear rate for one or more test agents at one or more locations in the in vitro placenta device.

A method of computationally modeling a placenta can include outputting simulated placenta data.

In some embodiments, a method of simulating a placenta can include: providing an in silico placenta model that is based on an in vitro placenta device; inputting test parameters for one of more test agents and/or one or more test conditions into the in silico placenta model; and generating simulated placenta data that simulates the one or more test agents and/or one or more test conditions in a real placenta.

In some embodiments, a method of simulating a placenta can include: determining an experimental dose of a test agent to achieve a target dosing amount to cross a placental barrier; running at least one simulation at a preliminary estimated value for the test agent; validating the simulation with experimental data from the in vitro placenta device; and simulating placenta data with the validated in silico placenta model.

In some embodiments, a method of simulating a placenta can include: elucidating one or more mechanisms for transport of a test agent and/or metabolism of the test agent in a placenta; running a simulation for the test agent with the in silico placenta model using one or more basic transport definitions and/or one or more basic metabolism definitions to obtain simulated placenta data; comparing the simulated placenta data with experimental data from the in vitro placenta device; and determining whether or not the simulated placenta data matches the experimental data.

In some embodiments, a method of simulating a placenta can include determining that the simulated data matches the experimental data and providing a report with the simulated data.

In some embodiments, a method of simulating a placenta can include determining that the simulated data does not match the experimental data, and then: changing at least one input, operating parameter, or boundary condition; and rerunning the simulation for the test agent.

In some embodiments, a method of simulating a placenta can include: obtaining in vitro transport data; and converting the in vitro transport data into synthetic in vivo transport data with the in silico placenta model.

In some embodiments, a method of simulating a placenta can include one or more of: determining one or more of protein binding, ionization, lipophilicity and molecular weight of one or more test agents, and inputting the same into the computing system; correlating fetal exposure to the test compound and toxicity to the fetus; modeling a maternal endothelium contribution to transport resistance; evaluating mechanisms of transplacental transport; or performing a sensitivity analysis to predict which factors are likely to be rate limiting for transfer and to identify factors that lead to placental dysfunction and increased fetal toxicity.

In some embodiments, a method of simulating a placenta, wherein the in silico placenta model is used for mechanistic modeling of transplacental transport, paracellular, transcellular, transporter mediated, and metabolism mechanisms.

In some embodiments, a method of simulating a placenta using the in silico placenta model includes boundary conditions as follows: i) fluid flow rates in maternal and fetal chambers set as constants at the inlets, ii) fluorescent compound concentration set as a constant at a maternal inlet, and iii) atmospheric pressure is set at all remaining inlets and outlets of the in vitro placenta device, wherein fluid properties of the media are assumed to be identical to water and assigned as constant volume conditions, wherein the fluid properties optionally include density and viscosity.

In some embodiments, a method of simulating a placenta can include: simulating the in vitro placenta device with the in silico placenta model; comparing simulation data of the simulation with real data from the in vitro placenta device; and iterating the simulation until simulation data matches the real data.

In some embodiments, a method of simulating a placenta can include calibrating diffusion coefficients for one or more test agent to fit the simulation data of the in silico placenta model or the maternal-fetal PBPK model with the real data of the in vitro placenta device.

In some embodiments, a method of simulating a placenta of claim can include the in silico placenta model: considering convective-diffusive transport, transporter mediated transport, metabolism, and combinations thereof; and/or obtaining data regarding specific transporters, metabolizing enzymes, and other parameters; and/or predicting factors that are rate limiting steps for transfer of an agent across a placental tissue. The in silico placental model can model passive placental diffusion by Fick's law; or can model with distribution differences related to partitioning (based on LogP), size exclusion (MW) and exclusion of ionized compounds.

In some embodiments, a hybrid placenta model system includes: a physical in vitro placenta device; and an in silico placenta model as obtained in one of the embodiments. The in silico placenta model can be on a computing system or on one or more non-transient memory devices with computer-executable instructions to perform the methods recited herein.

In some embodiments, a method of computationally modeling a placenta can include: generating a 3D geometry computer model of an in vitro placenta device; generating a mesh for the 3D geometry computer model; generating governing equations for the 3D computer model of operational conditions occurring within or upon the in vitro placenta device; generating volume and boundary conditions that characterize materials and/or conditions inside or at the boundary of the in vitro placenta device; and processing the computer model using a multiscale-multiphysics solver module to obtain an in silico model of the in vitro placenta device.

In some embodiments, the method of computationally modeling a placenta can include solving equations of fluid flow and species or heat transport of the 3D geometry computer model.

In some embodiments, the method of computationally modeling a placenta can include determining the operating parameters as follows: setting the fluid flow rate in the maternal circulation chamber; setting the fluid flow rate in the fetal circulation chamber; setting a test agent concentration as a constant for a given time period at an inlet of the maternal circulation chamber; and setting atmospheric pressure at all remaining inlets and outlets of the in vitro placenta device.

In some embodiments, the method of computationally modeling a placenta can include: generating velocity, pressure, and/or shear profiles with the in silico placenta model; and validating physiologically relevant sheer is achieved in the in vitro placenta device using the in silico placenta model.

In some embodiments, the method of computationally modeling a placenta can include: generating a permeability index of one or more test agents for one or more flow rates in the in vitro placenta device; generating a permeability index of the one or more test agents with the in silico placenta model; comparing the permeability indices from the in vitro placenta device and the in silico placenta model; calibrating or changing parameters as needed to match the values of the permeability indices; and validating the permeability index of the one or more test agents with the in vitro placenta model device and/or the in silico placenta model.

In some embodiments, the method of computationally modeling a placenta can include: generating data for the in vitro placenta device; and outputting data files of concentration, pressure, fluid velocity, and shear rate for one or more test agents and one or more operating conditions at one or more locations in their silico placenta model of the in vitro placenta device.

In some embodiments, the method of computationally modeling a placenta can include obtaining simulated data that matches the experimental data, the method further comprising: providing a report with the simulated data validating the simulated mechanisms.

In some embodiments, the method of computationally modeling a placenta can include: obtaining transport data using the in vitro placenta device; and converting the in vitro transport data into synthetic in vivo transport data with the in silico placenta model.

In some embodiments, the method of computationally modeling a placenta can include setting boundary conditions as follows: i) fluid flow rates in maternal and fetal chambers set as constants at the inlets, ii) fluorescent compound concentration set as a constant at a maternal inlet, and iii) atmospheric pressure set at all remaining inlets and outlets of the in vitro placenta device, wherein fluid properties of the media are d assigned as constant volume conditions, wherein the fluid properties optionally include density and viscosity.

In some embodiments, the method of computationally modeling a placenta can include: simulating the in vitro placenta device with the in silico placenta model; comparing simulation data with experimental data from the in vitro placenta device; and iterating the simulation parameters until simulation data matches the experimental data.

In some embodiments, the method of computationally modeling a placenta can include calibrating diffusion coefficients for one or more test agent to fit the simulation data of the in silico placenta model or the maternal-fetal PBPK model with the experimental data of the in vitro placenta device.

EXAMPLES

Microfabrication of Novel Microfluidic Placental Barrier Platform.

A physiologically relevant placental platform can be designed and developed using microfabrication methodologies. The microfabricated platform can be tested for structural and fluidic integrity using fluorescent molecules and particles.

Placental Barrier Co-culture in the Microfluidic Platform.

Using a native placental collagen-based extracellular matrix, a co-culture comprised of primary human endothelial (maternal and fetal) and immortalized trophoblast cell lines can be used. Conditions can be optimized for media composition, seeding densities and flow pattern (pulsatile vs. constant) in combination with morphological and functional evaluation, including viability, tight junction formation (e.g., permeability of small molecules) and trophoblast syncytialization. Finally, production of placenta-specific biomarkers (e.g., human chorionic gonadotropin, estriol) at physiologically relevant levels can be evaluated to validate trophoblast function.

Barrier Function in the Human Placental Co-Culture Model.

Placental barrier function can be demonstrated using positive control compounds that are known to readily cross the barrier (e.g., zofran, paracetamol, antipyrine) and negative control compounds that are known to not readily cross the barrier (e.g., inulin, trypan blue, heparin). Experimental transplacental transport data will be compared with explant and trophoblast monoculture data from literature. Toxicological effects on barrier integrity can be evaluated (e.g., tight junction formation, permeability).

Computational Model of the Placental Barrier Platform.

Development of an in silico model at the experimental microscale level allows creation of an interconnected physiologically-based pharmacokinetic (PBPK) maternal-fetal in silico model for predicting fetal exposure and toxicity. The fully developed in silico model will include a high-resolution 3D model of the placenta which connects maternal and fetal PBPK models. In silico transplacental drug transport can be characterized by results from the in vitro experiments (e.g., diffusion rate and permeability). As such, prediction of transplacental transport of one or more test agents by in silico simulation in the in silico barrier platform can be used to predict outcomes of real placenta. Specifically, using CoBi modeling tools, the in silico placenta model can characterize transplacental drug transport based on physicochemical properties (e.g., molecular weight, lipophilicity, ionized state), tissue properties (e.g., pH, thickness), and physics (e.g., convection-diffusion equation). Model simulations of known small molecules will be performed and validated.

One skilled in the art will appreciate that, for the processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In one embodiment, the present methods can include aspects performed on a computing system. As such, the computing system can include a memory device that has the computer-executable instructions for performing the methods. The computer-executable instructions can be part of a computer program product that includes one or more algorithms for performing any of the methods of any of the claims.

In one embodiment, any of the operations, processes, or methods, described herein can be performed or cause to be performed in response to execution of computer-readable instructions stored on a computer-readable medium and executable by one or more processors. The computer-readable instructions can be executed by a processor of a wide range of computing systems from desktop computing systems, portable computing systems, tablet computing systems, hand-held computing systems, as well as network elements, and/or any other computing device. The computer readable medium is not transitory. The computer readable medium is a physical medium having the computer-readable instructions stored therein so as to be physically readable from the physical medium by the computer/processor.

There are various vehicles by which processes and/or systems and/or other technologies described herein can be effected (e.g., hardware, software, and/or firmware), and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The various operations described herein can be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware are possible in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a physical signal bearing medium include, but are not limited to, the following: a recordable type medium such as a floppy disk, a hard disk drive (HDD), a compact disc (CD), a digital versatile disc (DVD), a digital tape, a computer memory, or any other physical medium that is not transitory or a transmission. Examples of physical media having computer-readable instructions omit transitory or transmission type media such as a digital and/or an analog communication medium (e.g., a fiber optic cable, a waveguide, a wired communication link, a wireless communication link, etc.).

It is common to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. A typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems, including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. Such depicted architectures are merely exemplary, and that in fact, many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include, but are not limited to: physically mateable and/or physically interacting components and/or wirelessly interactable and/or wirelessly interacting components and/or logically interacting and/or logically interactable components.

Figure 16:
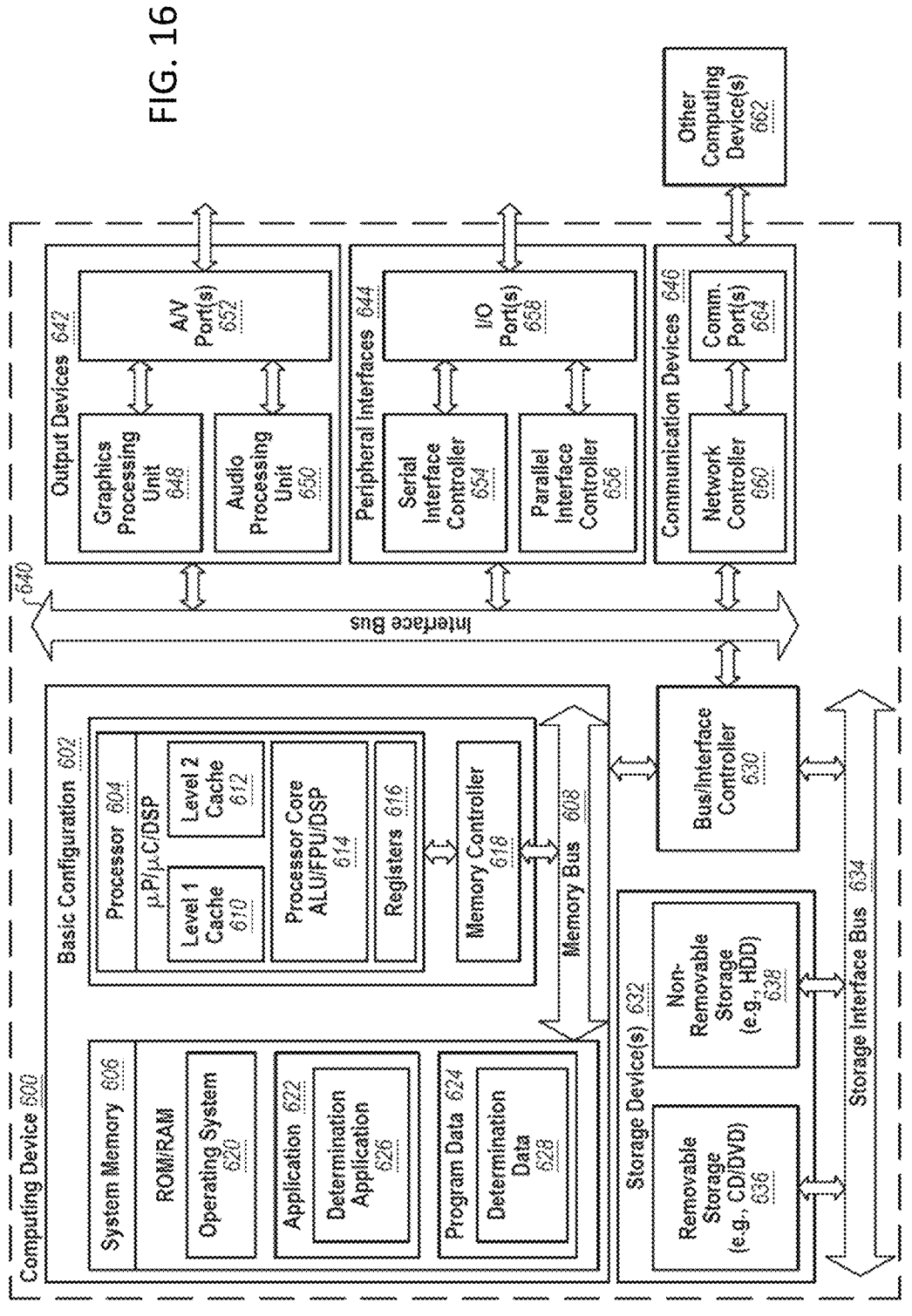
FIG. 16 illustrates an example of a computing system that can be used in the computing systems described herein to perform the computer-implemented methods.

FIG. 16 shows an example computing device 600 (e.g., a computer) that may be arranged in some embodiments to perform the methods (or portions thereof) described herein. In a very basic configuration 602, computing device 600 generally includes one or more processors 604 and a system memory 606. A memory bus 608 may be used for communicating between processor 604 and system memory 606.

Depending on the desired configuration, processor 604 may be of any type including, but not limited to: a microprocessor (RP), a microcontroller (RC), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations, memory controller 618 may be an internal part of processor 604.

Depending on the desired configuration, system memory 606 may be of any type including, but not limited to: volatile memory (such as RAM), non-volatile memory (such as ROM, flash memory, etc.), or any combination thereof. System memory 606 may include an operating system 620, one or more applications 622, and program data 624. Application 622 may include a determination application 626 that is arranged to perform the operations as described herein, including those described with respect to methods described herein. The determination application 626 can obtain data, such as pressure, flow rate, and/or temperature, and then determine a change to the system to change the pressure, flow rate, and/or temperature.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include: magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include: volatile and non-volatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to: RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 600 may also be implemented as a personal computer including both laptop computer and non-laptop computer configurations. The computing device 600 can also be any type of network computing device. The computing device 600 can also be an automated system as described herein.

The embodiments described herein may include the use of a special purpose or general-purpose computer including various computer hardware or software modules.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In some embodiments, a computer program product can include a non-transient, tangible memory device having computer-executable instructions that when executed by a processor, cause performance of a method comprising computer-implemented steps as described herein.

Additionally, machine learning and deep learning techniques are utilized to assess the in vitro data and/or the in silico data. The invention provides methods that can be utilized to assess the translocation of agents across a placenta tissue (e.g., computer methods performed on data from in vitro or in silico source), and then determine whether the agent translocated sufficiently for a treatment or a toxicity to the fetus. The invention includes methods, system, apparatus, computer program product, among others, to carry out the following protocols, such as for generating a predicted biological data for a subject placenta based on the real in vitro biological data or in silico biological data. The predicted biological data from a model can be based on a perturbation or setting of at least one attribute of the subject for the in vitro or in silico data. The predicted biological data can be based on a simulation by a computer program for the simulated placenta model.

The methods can include receiving an in vitro data derived from in vitro tissue model. Based on the in vitro data, the method can include providing input vectors to a machine learning platform. The machine learning platform processes the input vectors in order to generate output that includes a generated in silico data of a simulated placenta model.

In some embodiments, the machine learning platform comprises one or more deep neural networks. In some aspects, the machine learning platform comprises one or generative adversarial networks. In some aspects, the machine learning platform comprises an adversarial auto-encoder architecture.

Deep neural networks (DNNs) are computer system architectures that have recently been created for complex data processing and artificial intelligence (AI). DNNs are machine learning models that employ more than one hidden layer of nonlinear computational units to predict outputs for a set of received inputs. DNNs can be provided in various configurations for various purposes, and continue to be developed to improve performance and predictive ability.

In some embodiments, the executed method performed by the computer program product further comprises further training a model with reinforced leaning. The reinforced learning produces the reconstructed objects having a defined characteristic. In some aspects, the training of the trained model with the reinforced learning includes: discarding the object encoder; fixing weights of all layers of the object decoder except for a first layer of the object decoder; performing the following steps until convergence: estimate a mean and variance for each dimension of a previously obtained distribution of latent variables, the previously obtained distribution of latent variables being defined as a learnable prior; obtain an exploration latent variable for each dimension from outside of the latent variables produced by the encoder; pass the exploration latent variable through a decoder to obtain a reconstructed object based on the exploration latent variable; compute rewards for the reconstructed object based on at least one defined reward; and apply a single gradient ascent step to maximize a total reward with respect to a parameter of the learned prior and first layer of the decoder.

An autoencoder (AE) is a type of deep neural network (DNN) used in unsupervised learning for efficient information coding. The purpose of an AE is to learn a representation (e.g., encoding) of objects. An AE contains an encoder part, which is a DNN that transforms the input information from the input layer to the latent representation (e.g., latent code), and includes a decoder part, which uses the latent representation and decodes an original object with the output layer having the same dimensionality as the input for the encoder. Often, a use of an AE is for learning a representation or encoding for a set of data. An AE learns to compress data from the input layer into a short code, and then un-compress that code into something that closely matches the original data.

Generative Adversarial Networks (GANs) are structured probabilistic models that can be used to generate data. GANs can be used to generate data (e.g., a molecule) similar to the dataset (e.g., molecular library) GANs are trained on. A GAN can include two separate modules, which are DNN architectures called: (1) discriminator and (2) generator. The discriminator estimates the probability that a generated product comes from the real dataset, by working to compare a generated product to an original example, and is optimized to distinguish a generated product from the original example. The generator outputs generated products based on the original examples. The generator is trained to generate products that are as real as possible compared to an original example. The generator tries to improve its output in the form of a generated product until the discriminator is unable to distinguish the generated product from the real original example.

Adversarial Autoencoders (AAEs) are probabilistic AEs that use GANs to perform variational inference. AAEs are DNN-based architectures in which latent representations are forced to follow some prior distribution via the discriminator.

A conditional architecture may be considered a supervised architecture because the processing is supervised by the condition. As such, the conditional architecture may be configured for generating objects that match a specific condition (e.g., property of translocation of a molecule through the placenta). In some applications, a conditional model can take values of conditions into account, even if the values of conditions are only partially known. During the generation process, the conditional architecture may only have a few conditions that are specified, and thereby the rest of the conditions can take arbitrary values, at least initially.

Modern deep generative models are usually separated into two main categories. The first category is related to Generative Adversarial Networks (GAN), and the second one corresponds to models similar to Variational Autoencoders (VAE). Generative Adversarial Network is a model consisting of two networks—a generator and a discriminator. The generator produces a set of novel objects, while the discriminator tries to distinguish them from real ones. Variational and Adversarial Autoencoders build an autoencoder model with a regularizer that shapes the latent space. GANs produce state-of-the-art samples in specific domains, but Autoencoder-based approach allows training with discrete data and prevents the mode collapse problem.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., " a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

All references recited herein are incorporated herein by specific reference in their entirety.

ADDIN ZOTERO_BIBL 1 {"uncited":[], "omitted":[], "custom":[]} CSL_BIBLIOGRAPHY 1. Mitchell, A. A. et al. Medication Use During Pregnancy, With Particular Focus On Prescription Drugs: 1976-2008. *Am. J. Obstet. Gynecol.* 205, 51.e1-51.e8 (2011).

2. USHIJIMA, K. et al. Placental transport of bile acids: analysis of bile acids in maternal serum and urine, umbilical cord blood, and amniotic fluid. *Kurume Med. J.* 48, 87-91 (2001).

3. Feghali, M., Venkataramanan, R. & Caritis, S. Pharmacokinetics of drugs in pregnancy. *Semin. Perinatol.* 39, 512-519 (2015).

4. Al-Enazy, S., Ali, S., Albekairi, N., El-Tawil, M. & Rytting, E. Placental Control of Drug Delivery. *Adv. Drug Deliv. Rev.* 116, 63-72 (2017).

5. Aghababaei, M., Hogg, K., Perdu, S., Robinson, W. & Beristain, A. ADAM12-directed ectodomain shedding of E-cadherin potentiates trophoblast fusion. *Cell Death Differ.* 22, 1970-1984 (2015).

6. Leach, L. & Firth, J. A. Advances in understanding permeability in fetal capillaries of the human placenta: a review of organization of the endothelial paracellular clefts and their junctional complexes. *Reprod. Fertil. Dev.* 7, 1451-1456 (1995).

7. Kwok, A. K. H., Yeung, C.-K., Lai, T. Y. Y., Chan, K.-P. & Pang, C. P. Effects of trypan blue on cell viability and gene expression in human retinal pigment epithelial cells. *Br. J. Ophthalmol.* 88, 1590-1594 (2004).

8. Awad, D., Schrader, I., Bartok, M., Mohr, A. & Gabel, D. Comparative Toxicology of Trypan Blue, Brilliant Blue G, and Their Combination Together with Polyethylene Glycol on Human Pigment Epithelial Cells. *Invest. Ophthalmol. Vis. Sci.* 52, 4085-4090 (2011).

9. Herland, A. et al. Quantitative prediction of human pharmacokinetic responses to drugs via fluidically coupled vascularized organ chips. *Nat. Biomed. Eng.* 1-16 (2020) doi:10.1038/s41551-019-0498-9.

10. Kannan, R. et al. A quasi-3D wire approach to model pulmonary airflow in human airways. *Int. J. Numer. Methods Biomed. Eng.* 33, e2838 (2017).

11. Przekwas A., Friend T., Teixeira R., Chen ZJ., Wilkerson P.,. *Spatial Modeling Tools for Cell Biology.* www.dtic.mil/cgi-bin/GetTRDoc?AD=ADA460852 (2006).

12. Przekwas, A., German, C., Garimella, T. & Singh, N. Multiscale Simulation Framework for Personalized Pharmacology, Integrating Machine Learning with Multiscale Modeling for Biomedical, Biological, and Behavioral Systems. (2019).

13. Chen, Z. & Przekwas, A. A coupled pressure-based computational method for incompressible/compressible flows. *J. Comput. Phys.* 229, 9150-9165 (2010).

14. German, C., Boyer, A., Przekwas, A., Bader, S. E. & Cabal, A. A physiologically based model to capture species-dependent differences in oxygen distribution in the posterior eye. *Model. Artif. Intell. Ophthalmol.* 3, 10-42 (2021).

15. Kannan, R. & Przekwas, A. A multiscale absorption and transit model for oral drug delivery: Formulation and applications during fasting conditions. *Int. J. Numer. Methods Biomed. Eng.* 36, e3317 (2020).

The invention claimed is:

1. A method of computationally modeling a placenta, comprising:

generating a 3D geometry computer model of an in vitro placenta device;

generating a mesh for the 3D geometry computer model;

applying the mesh to the 3D geometry computer model;

performing a grid independence test on the mesh;

determining the mesh to be valid for the in vitro placenta device;

in response to determining the mesh to be valid for the in vitro placenta device, generating governing equations for the 3D computer model of operational conditions occurring within or upon the in vitro placenta device;

generating volume and boundary conditions that characterize materials and/or conditions inside or at the boundary of the in vitro placenta device; and processing the computer model using a multiscale-multiphysics solver module to obtain an in silico model of the in vitro placenta device.

2. The method of computationally modeling a placenta of claim 1, further comprising:

obtaining data from an in vitro placenta device, wherein the in vitro placenta model device is a physical model of a placenta;

creating an in silico model of the in vitro placenta device; and generating a physiology-based pharmacokinetic (PBPK) model of the placenta as the in silico placenta model.

3. The method of computationally modeling a placenta of claim 1, wherein applying the mesh to the 3D geometry computer model comprises applying a structured quadrilateral mesh to the 3D geometry computer model.

4. The method of computationally modeling a placenta of claim 3, further comprising solving equations of fluid flow and species or heat transport of the 3D geometry computer model.

5. The method of computationally modelling a placenta of claim 4, further comprising setting operating parameters of the in silico placenta model, which operating parameters are applied as boundary conditions.

6. The method of computationally modelling a placenta of claim 5, wherein the in vitro placenta device comprises:

a maternal circulation chamber;

an intervillous space chamber adjacent to and porously coupled with the maternal circulation chamber;

a placental barrier chamber adjacent to and porously coupled with the intervillous space;

a fetal circulation chamber adjacent to and porously coupled with the placental barrier chamber;

wherein:

a first porous wall is positioned between the maternal circulation chamber and the intervillous space, a second porous wall is positioned between the intervillous space and the placental barrier chamber, and a third porous wall is positioned between the placental barrier chamber and the fetal circulation chamber, the maternal circulation chamber includes maternal endothelial cells;

the intervillous space chamber includes maternal endothelial cells or is devoid of cells;

the placental barrier space includes placental cells; and the fetal circulation chamber includes fetal endothelial cells;

which is configured as a microfluidic in vitro model of a placenta.

7. The method of computationally modelling a placenta of claim 6, comprising the operating parameters as follows:

setting the fluid flow rate in the maternal circulation chamber;

setting the fluid flow rate in the fetal circulation chamber;

setting a test agent concentration as a constant for a given time period at an inlet of the maternal circulation chamber; and setting atmospheric pressure at all remaining inlets and outlets of the in vitro placenta device.

8. The method of computationally modelling a placenta of claim 6, further comprising setting fluid properties as constant volume conditions.

9. The method of computationally modelling a placenta of claim 6, further comprising at least one of:

generating velocity, pressure, and/or shear profiles with the in silico placenta model; and validating physiologically relevant sheer is achieved in the in vitro placenta device using the in silico placenta model.

10. The method of computationally modelling a placenta of claim 6, further comprising at least one of:

generating a permeability index of one or more test agents for one or more flow rates in the in vitro placenta device;

generating a permeability index of the one or more test agents with the in silico placenta model;

comparing the permeability indices from the in vitro placenta device and the in silico placenta model;

calibrating or changing parameters as needed to match the values of the permeability indices; and validating the permeability index of the one or more test agents with the in vitro placenta model device and/or the in silico placenta model.

11. The method of computationally modelling a placenta of claim 1, comprising fitting the in silico placenta model parameters to match outputs from the in silico placenta model with in vitro placenta device data.

12. The method of computationally modelling a placenta of claim 1, comprising:

inputting input parameters for one or more conditions and/or one or more test agents into the in silico placenta model; and generating simulated placenta data for the one or more conditions and/or one or more test agents.

13. The method of computationally modelling a placenta of claim 1, further comprising generating a simulation file by:

selecting time step size and total number of time steps;

defining additional reactions to characterize metabolism kinetics;

defining boundary conditions; and defining volume conditions.

14. The method of computationally modelling a placenta of claim 13, further comprising generating simulation results of the in silico placenta model.

15. The method of computationally modelling a placenta of claim 14, further comprising solving equations that define the in silico placenta model by:

reading geometry and mesh data;

reading definitions and reactions from the simulation file; and simultaneously solving the equations at east mesh node.

16. The method of computationally modelling a placenta of claim 14, further comprising:

generating data for the in vitro placenta device; and outputting data files of concentration, pressure, fluid velocity, and shear rate for one or more test agents and one or more operating conditions at one or more locations in thein silico placenta model of the in vitro placenta device.

17. The method of computationally modelling a placenta of claim 16, further comprising outputting simulated placenta data.

18. A method of simulating an in vivo placenta, comprising:

providing an in silico placenta model that is based on an in vitro placenta device, the in vitro placenta device comprising a maternal circulation chamber, an intervillous space chamber, a placental barrier chamber, and a fetal circulation chamber, wherein the in silico placenta model is generated based on in vitro data obtained from at least one in vitro test agent that passes through the in vitro placenta device;

inputting test parameters for one of more test agents and/or one or more test conditions into the in silico placenta model; and generating simulated placenta data that simulates the one or more test agents and/or one or more test conditions in the in vivo placenta.

19. The method of simulating the in vivo placenta of claim 18, further comprising:

determining an experimental dose of a test agent to achieve a target dosing amount to cross a placental barrier;

running at least one simulation at a preliminary estimated value for the test agent;

validating the simulation with experimental data from the in vitro placenta device; and simulating placenta data with the validated in silico placenta model.

20. The method of simulating the in vivo placenta of claim 18, further comprising:

elucidating one or more mechanisms for transport of a test agent and/or metabolism of the test agent in a placenta;

running a simulation for the test agent with the in silico placenta model using one or more basic transport definitions and/or one or more basic metabolism definitions to obtain simulated placenta data;

comparing the simulated placenta data with experimental data from the in vitro placenta device; and determining whether or not the simulated placenta data matches the experimental data.

21. The method of simulating the in vivo placenta of claim 20, when the simulated data matches the experimental data, the method further comprising:

providing a report with the simulated data validating the simulated mechanisms.

22. The method of simulating the in vivo placenta of claim 20, when the simulated data does not match the experimental data, the method further comprising:

changing at least one input, operating parameter, or boundary condition; and rerunning the simulation for the test agent.

23. The method of simulating the in vivo placenta of claim 18, further comprising:

obtaining transport data using the in vitro placenta device; and converting the in vitro transport data into synthetic in vivo transport data with the in silico placenta model.

24. The method of simulating the in vivo placenta of claim 18, further comprising one or more of:

determining one or more of protein binding, ionization, lipophilicity and molecular weight of one or more test agents, and inputting the same into the computing system;

correlating fetal exposure to the test compound and toxicity to the fetus;

modeling a maternal endothelium contribution to transport resistance;

evaluating mechanisms of placental transport; or performing a sensitivity analysis to predict which factors are likely to be rate limiting for transport and to identify factors that lead to placental dysfunction and increased fetal toxicity.

25. The method of simulating the in vivo placenta of claim 18, wherein the in silico placenta model is used for mechanistic modeling of placental transport, including paracellular, transcellular, and transporter mediated, and metabolism mechanisms.

26. The method of simulating the in vivo placenta of claim 18, wherein the in silico placenta model includes boundary conditions as follows:

i) fluid flow rates in the maternal circulation chamber and the fetal circulation chamber set as constants at the inlets, ii) fluorescent compound concentration set as a constant at a maternal inlet, and iii) atmospheric pressure set at all remaining inlets and outlets of the in vitro placenta device, wherein fluid properties of the media are assigned as constant volume conditions, wherein the fluid properties optionally include density and viscosity.

27. The method of simulating the in vivo placenta of claim 18, further comprising:

simulating the in vitro placenta device with the in silico placenta model;

comparing simulation data with experimental data from the in vitro placenta device; and iterating the simulation parameters until simulation data matches the experimental data.

28. The method of simulating the in vivo placenta of claim 18, comprising calibrating diffusion coefficients for one or more test agent to fit the simulation data of the in silico placenta model or the maternal-fetal PBPK model with the experimental data of the in vitro placenta device.

29. The method of simulating the in vivo placenta of claim 18, wherein the in silico placenta model:

considers convective-diffusive transport, transporter mediated transport, metabolism, and combinations thereof; and/or obtains data regarding specific transporters, metabolizing enzymes, and other parameters; and/or predicts factors that are rate limiting steps for transfer of an agent across a placental tissue.

30. A hybrid placenta model system comprising:

a physical in vitro placenta device; and an in silico placenta model as obtained in claim 1.

* * * * *